United States Patent [19]

Komoda et al.

[11] Patent Number: 4,599,598

[45] Date of Patent: Jul. 8, 1986

[54] DATA TRANSMISSION SYSTEM UTILIZING POWER LINE

[75] Inventors: Yoshiyuki Komoda, Osaka; Hitoshi Fukagawa, Kadoma; Yoshiharu Suzuki, Kadoma; Osamu Tanaka, Kadoma, all of Japan

[73] Assignee: Matsushita Electric Works, Ltd., Kadoma, Japan

[21] Appl. No.: 735,745

[22] Filed: May 20, 1985

Related U.S. Application Data

[63] Continuation of Ser. No. 406,479, Aug. 9, 1982, abandoned.

[30] Foreign Application Priority Data

Sep. 14, 1981 [JP] Japan .................................. 56-144910
Nov. 14, 1981 [JP] Japan .................................. 56-182858

[51] Int. Cl.⁴ .............................................. H04B 3/56
[52] U.S. Cl. ............................. 340/310 A; 340/825.02; 455/14
[58] Field of Search .......... 340/310 R, 310 A, 825.02, 340/825.50, 825.52; 179/170 R; 455/7, 14, 15, 16

[56] References Cited

U.S. PATENT DOCUMENTS

| | | | |
|---|---|---|---|
| 3,944,723 | 3/1976 | Fong | 340/825.02 |
| 3,967,264 | 6/1976 | Whyte | 340/310 A |
| 3,973,240 | 8/1976 | Fong | 340/310 A |
| 4,097,692 | 6/1978 | Felix | 340/310 R |
| 4,142,178 | 2/1979 | Whyte | 340/310 R |
| 4,204,195 | 5/1980 | Bogacki | 340/870.02 |
| 4,250,489 | 2/1981 | Dudash | 340/825.02 |
| 4,377,804 | 3/1983 | Suzuki | 340/310 A |
| 4,427,968 | 1/1984 | York | 340/310 R |
| 4,516,122 | 5/1985 | Tomikawa | 340/825.52 |

Primary Examiner—John W. Caldwell, Sr.
Assistant Examiner—Michael F. Heim
Attorney, Agent, or Firm—Staas & Halsey

[57] ABSTRACT

A data transmission system utilizing a power line comprises a transmitter (1), a receiver (2) and a repeater (5) coupled to a power line (3). Control data including a start code in the form of a high frequency signal is transmitted from the transmitter (1) in superposition on an alternating current of the commercial power supply using the power line. The repeater receives the control data transmitted from the transmitter, thereby to store the control data in a memory responsive to the start code. The control data is then read from the memory after the lapse of a predetermined period of time and is retransmitted to the receiver in a predetermined level. The receiver receives the control data, thereby to control an apparatus being controlled such as a relay, whereupon the same transmits in a return manner the data representing a control state thereof. The repeater receives the data and transmits the same to the transmitter.

6 Claims, 32 Drawing Figures

FIG. 20
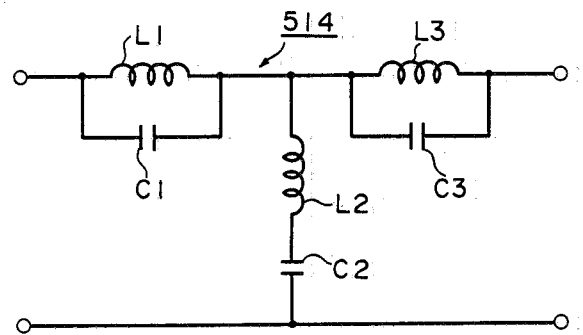
FIG. 21
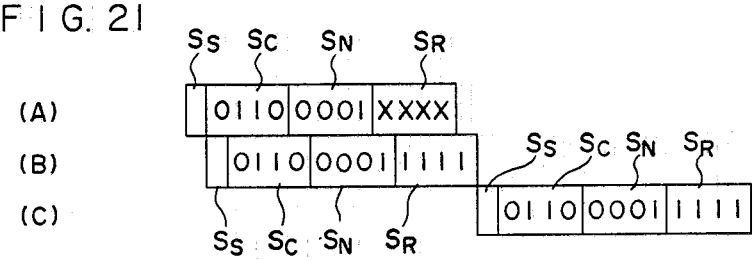
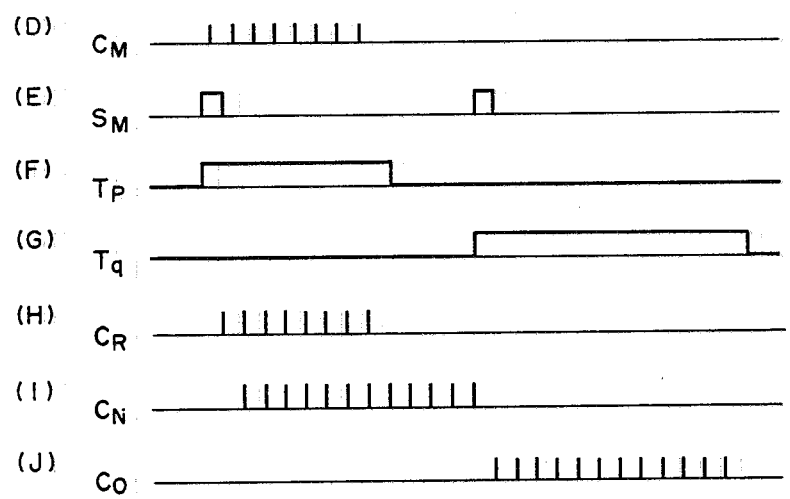

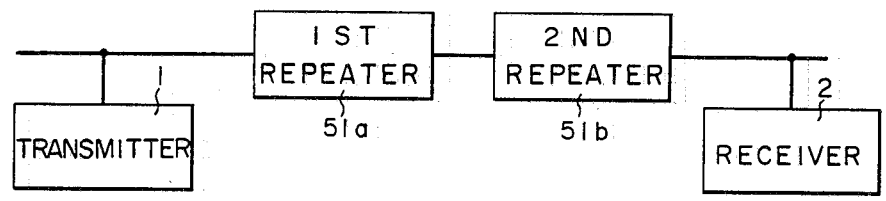

FIG. 25
(A)
(B)
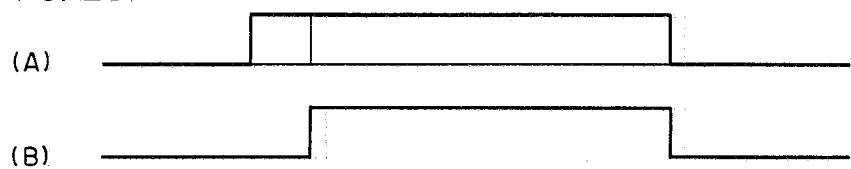
FIG. 26
| TIMING | TRANSMITTER | 1ST REPEATER | 2ND REPEATER | RECEIVER |
|---|---|---|---|---|
| t0 | → | ∼∼ | | |
| t1 | | → | ∼→ | |
| t2 | → | | → | |
| t3 | | --→ | ← | ← |
| t4 | | ∼← ↓ | ← | |
| t5 | | → | ∼→ | |
| t6 | | ← | → | |
FIG. 27
(A)
(B)
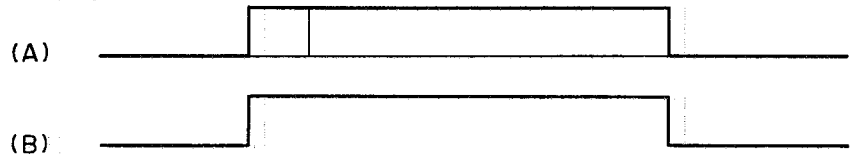
FIG. 28
| TIMING | TRANSMITTER | 1ST REPEATER | 2ND REPEATER | RECEIVER |
|---|---|---|---|---|
| t0 | → | | | |
| t1 | --→ | ∼→ | | |
| t2 | ↓ → | | ∼← | |
| t3 | | → | | |
| t4 | | | | |

FIG. 29
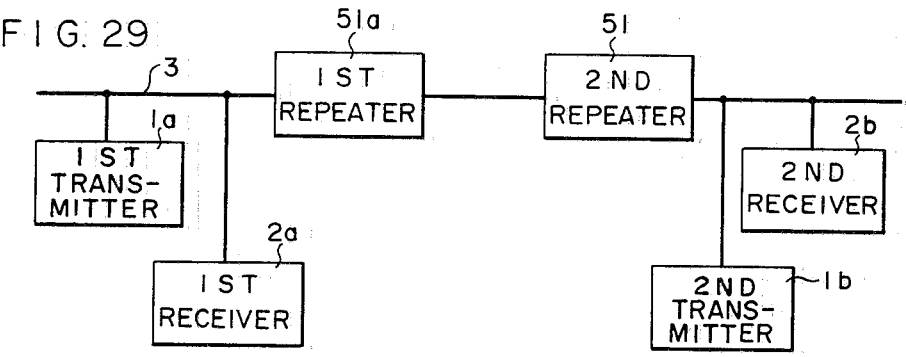
FIG. 30
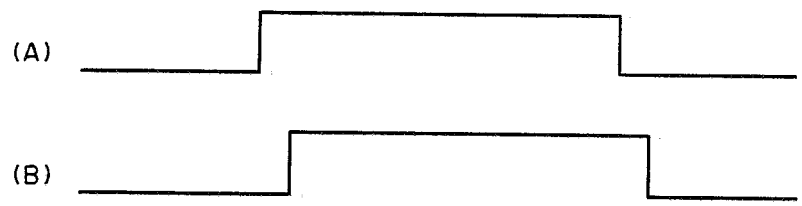
FIG. 31
| TIMING | 1ST TRANSMITTER | 1ST REPEATER | 2ND REPEATER | 2ND TRANSMITTER |
|---|---|---|---|---|
| t0 | → | ∼∼→ | ∼∼∼ | ←-- |
| t1 |  | → | ∼∼→ | ←-- |
| t2 |  | ∼∼ | → | ←-- |
| t3 |  | ∼∼ | ∼∼ | ← |
| t4 |  | ∼∼ | ← |  |
| t5 |  | ← | ∼∼∼ |  |

DATA TRANSMISSION SYSTEM UTILIZING POWER LINE

This is a continuation of co-pending application Ser. No. 406,479, filed on Aug. 9, 1982, now abandoned.

BACKGROUND OF THE INVENTION

1. Field of the Invention

The present invention relates to a data transmission system utilizing a power line. More specifically, the present invention relates to an improvement in a data transmission system utilizing a power line, wherein a transmitter and a receiver are coupled to a power line, control data is transmitted from the transmitter and is received by the receiver, whereby a load provided in the receiver is controlled and data representing a control state of the load is then transmitted from the receiver to the transmitter.

This invention is an improvement upon the invention of U.S. patent application Ser. No. 406,196, filed on the same date, entitled "Date Transmission System Utilizing Power Line", and commonly owned.

2. Description of the Prior Art

FIG. 1 is a block diagram showing a data transmission system utilizing a power line which constitutes the background of the present invention. FIG. 2 is a graph showing a level of a transmission data in the FIG. 1 data transmission system.

Referring to FIGS. 1 and 2, a conventional data transmission system utilizing a power line will be described. As shown in FIG. 1, a transmitter 1 and a receiver 2 are coupled to a power line 3. The transmitter 1 transmits control data including a plurality of bits in the form of high frequency signal of say 100 kHz superimposed on an alternating current of a commercial power supply. The receiver 2 receives the control data, thereby to control an apparatus being controlled such as a relay and transmits in a return manner return data representing a control state of the apparatus being controlled to the transmitter 1. Such data transmission system utilizing a power line is more fully disclosed in the co-pending U.S. patent application, Ser. No. 200,079, entitled "Data Transmission System Utilizing Power Line", filed Oct. 24, 1980 by Yoshiharu Suzuki and assigned to the same assignee as the present invention. Therefore, the above described application is incorporated herein by reference thereto.

In the case of such data transmission system, the power line 3 has an inherent resistance and also has a load 4 of a capacitive nature coupled. Therefore, the level of the control data transmitted from the transmitter 1 is decreased as a result of the influence by such resistance and the capacitive load 4. More specifically, if and when the distance between the point A where the transmitter 1 is installed and the point B where the receiver 2 is installed is large, the level of the data transmitted from the transmitter 1 becomes smaller than a level receivable by a receiver 2 before the data reaches the receiver 2. Therefore, it could happen that an apparatus being controlled coupled to the receiver 2 cannot be controlled, in the case where the distance between the transmitter 1 and the receiver 2 is large. Similarly, the data representing a control state of the apparatus being controlled cannot be returned from the receiver 2 to the transmitter 1.

In order to eliminate such problems, it is necessary to take any of the approaches in which the output level of the data transmitted from the transmitter 1 is increased, the reception sensitivity of the receiver 2 is increased and an attenuation amount of the level of the data in transmission over a power line is decreased. However, an increase of the output level of the transmitter 1 threatens to cause an electric wave interference upon other machines inasmuch as the carrier wave of the control data is as relatively high as 100 kHz. On the other hand, an increase of the reception sensitivity of the receiver 2 could cause the receiver 2 to receive even a noise other than the data, with the resultant fear of malfunction by the receiver 2. Thus, in order to transmit the control data in a proper level in an increased distance between the transmitter 1 and the receiver 2, it is considered most appropriate to decrease an attenuation amount of the level in transmission over the power line 3. However, a decrease of an inherent resistance of a power line or a capacitive load 4 entails another difficult problem that a particularly designed power line need to be utilized.

SUMMARY OF THE INVENTION

A principal object of the present invention is to provide a data transmission system utilizing a power line, wherein an attenuation amount of a transmission signal is substantially reduced even in the case of an increased distance between a transmitter and a receiver by providing a repeater between the transmitter and the receiver.

Briefly described, the present invention comprises repeater means interposed in a power line between first communicating means comprising first transmitting means and first receiving means and second communicating means comprising second transmitting means and second receiving means coupled to the power line. When either of the first and second communicating means transmits data, the repeating means stores the data and reads the stored data after the lapse of a predetermined time period and then transmits the same to the other of the first and second communicating means in a predetermined level.

Therefore, in accordance with the present invention, the level of the data is increased by the repeating means and retransmitted, even in the case where the first and second communicating means are provided far remotely spaced apart from each other with an inherent resistance of the power line therebetween or with a capacitive load involved so that the level of the data is decreased, with the result that an attenuation amount of the level of the data can be substantially decreased.

In a preferred embodiment of the present invention, a plurality of repeating means are provided between the first communication means and the second communicating means and the data including in the control data an identifying code for identifying the repeater means provided at the position closest to the first communicating means is transmitted from the first communicating means. The repeater means provided at the position closest to the first communicating means stores the transmitted control data when the transmitted identifying code is of its own identifying code. Then the identifying code is renewed to an identifying code of the next adjacent repeating means and the above described stored data as well as the said identifying code is read and transmitted.

Thus, even if a plurality of repeating means are provided between the first and second communicating means, the respective repeating means are designated in succession by the respective identifying codes and the control data is transmitted, so that a loop is formed between the respective repeater means, whereby transmission of the control data is prevented from being repetitiously made among the respective repeating means.

In another preferred embodiment of the present invention, a busy signal representing that the control data is now in transmission is transmitted when the control data is transmitted. Each of the repeating means is adapted to detect the busy signal to be reset and comprises time measuring means for measuring a different period of time after the busy signal is detected. Each of the repeating means is further adapted to repeat the control data whenever the predetermined period of time is measured.

Accordingly, in the case where the repeating means are provided at the position spaced apart from the first communicating means in one direction and at the other position spaced apart from the first communicating means in the other direction, one of the repeating means transmits the busy signal as well as the control data after the lapse of a predetermined period of time since the busy signal comes not to be transmitted. At that time, the time measuring means included in the other repeating means is still measuring the time and therefore the one repeating means is reset responsive to the busy signal being transmitted and the same is controlled not to transmit the control data. Therefore, the respective repeating means cannot repeat the control data simultaneously and the respective repeating means are prevented from simultaneously transmitting the control data to the first communicating means and hence inteference can be prevented.

In a further preferred embodiment of the present invention, a plurality of repeating means are provided between the first and second communicating means and the respective repeating means are each provided with high frequency signal blocking means for blocking passage of a high frequency signal while allowing passage of an alternating current of the power supply. When the control data is transmitted from the first communicating means, for example, each of the repeating means provides a busy signal in one and the other directions with respect to the high frequency signal blocking means, thereby to allow only transmission of the control data by the first communicating means. Therefore, the second communicating means, for example, cannot return control state data. As a result, interference is prevented from occurring between the control data transmitted from the first communicating means and the control state data to be returned from the second communicating means.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 20 is a schematic diagram of one example of a blocking filter shown in FIG. 19;

FIG. 21 is a timechart for depicting an operation of the FIG. 19 repeater;

FIG. 22 is a block diagram of a data transmission system employing two repeaters as shown in FIG. 19 between the transmitter and the receiver;

FIGS. 23 and 24 are views for depicting the flow of the transmitting signals in the FIG. 22 data transmission system;

FIG. 25 is a timechart for depicting the timing of the transmitting signal received by and the busy signal transmitted by the FIG. 19 repeater;

FIG. 26 is a view for depicting the flow of the singal in the data transmission system in the case where the busy signal is transmitted during reception of the transmitting signal by the FIG. 19 repeater;

FIG. 27 is a view for depicting the timing of the transmitting signal and the busy signal transmitted by the repeater;

FIG. 28 is a view for depicting the flow of the signal in the data transmission system in the case where the busy signal is transmitted when the transmitting signal is being transmitted by the repeater;

FIG. 29 is a block diagram of a data transmission system in accordance with still a further embodiment of the present invention;

FIG. 30 is a timechart for depicting the major portion of the repeater in FIG. 29;

FIG. 31 is a view for depicting the flow of the signal in the FIG. 29 data transmission system.

DESCRIPTION OF THE PREFERRED EMBODIMENTS

Figure 3:
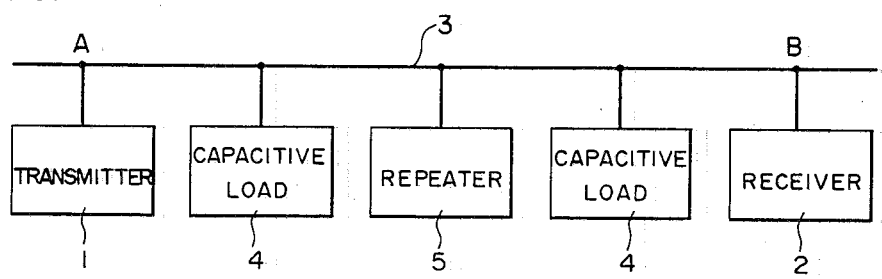
FIG. 3 is a block diagram depicting a concept of the present invention.
Figure 4:
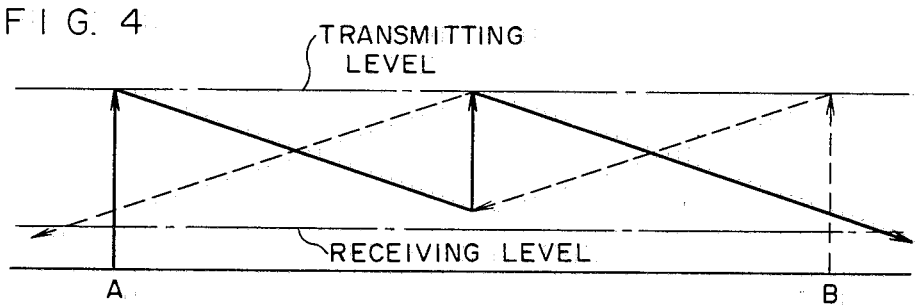
FIG. 4 is a graph showing the levels of the transmitting and receiving signals in the FIG. 3 data transmission system.

FIG. 3 is a block diagram showing an outline of the present invention and FIG. 4 is a graph showing the transmission and reception level of the inventive data transmission system.

Figure 1:
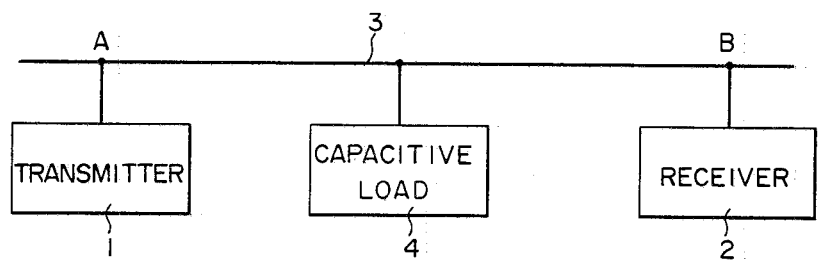
FIG. 1 is a block diagram showing a data transmission system utilizing a power line which constitutes the background of the present invention.
Figure 2:
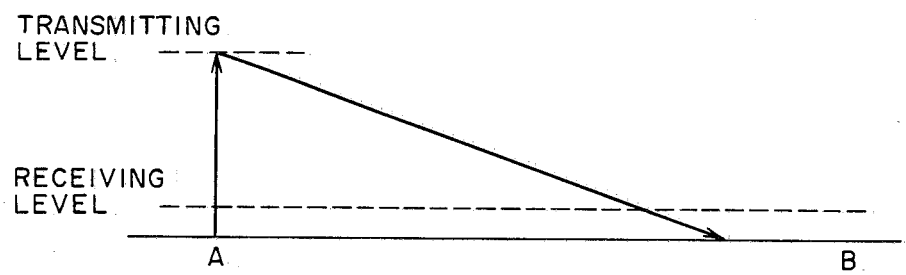
FIG. 2 is graph showing the level of the transmitting and receiving signals in the data transmission system utilizing a power line which constitutes the background of the present invention.

First referring to FIGS. 3 and 4, an outline of the present invention will be described. As in the case of the previously described FIG. 1 diagram, a transmitter 1 and a receiver 2 are coupled to a power line 3. The FIG. 3 embodiment further comprises a repeater 5 constituting a feature of the present invention, which is interposed in the power line 3 between the transmitter 1 and the receiver 2. The portion of the power line 3 between the transmitter 1 and the repeater 5 and the portion of the power line 3 between the repeater 5 and the receiver 2 each has an inherent resistance and a capacitive load 4 coupled thereto. The repeater 5 is adapted to store temporarily the data transmitted from one of the transmitter 1 and the receiver 2 and to retransmit the same to the other of the transmitter 1 and the receiver 2 after the lapse of a predetermined period of time. Thus, by providing the repeater 5 between the transmitter 1 and receiver 2, the level of the control data as attenuated received from the transmitter 1 coupled to the power line 3 at the point A is boosted or increased by the repeater 5 and the control data 5 thus boosted is retransmitted so that the data can reach the receiver 2 coupled to the power line 3 at the point B, as shown by the solid line in FIG. 4. An apparatus being controlled coupled to the receiver 2 is controlled in response to the control data transmitted from the transmitter 1 and the control state data representing a control state of the apparatus being controlled at that time is returned from the receiver 2 through the repeater 5 to the transmitter 1. The level of the control state data thus returned is also boosted or increased by means of the repeater 5, as shown by the dotted line in FIG. 4. Accordingly, even if the transmitter 1 and the repeater 2 are far remotely spaced apart from each other, the level of the control data attenuated in transmission through the power line 3 is increased by the repeater 5 and hence the attenuation amount of the level of the control data in the power line 3 can be substantially decreased.

Figure 5:
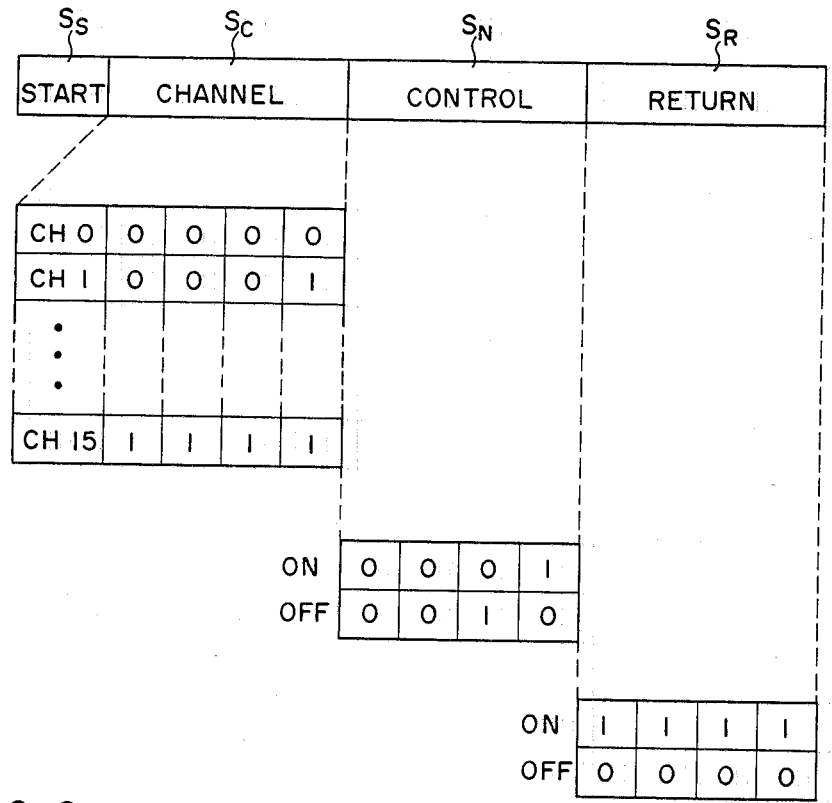
FIG. 5 is a view showing the contents of the transmitting signal for use in the present invention.
Figure 6:
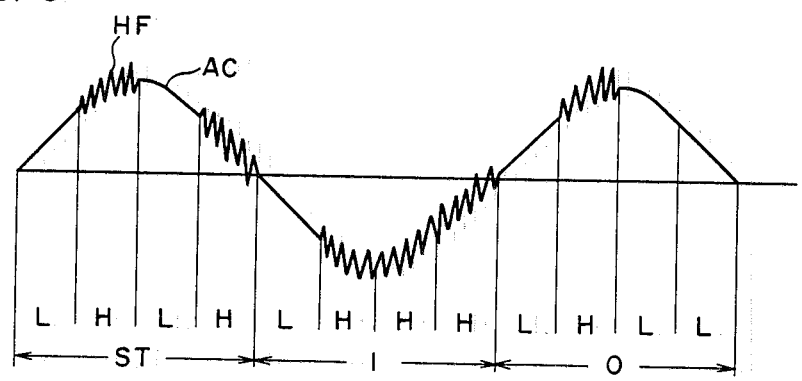
FIG. 6 is a graph showing a transmitting signal superimposed on a power supply alternating current.

FIG. 5 is a diagram for depicting the control data applied to one embodiment of the present invention and FIG. 6 is a graph showning the control data in the form of a high frequency signal superimposed on the alternating current of a power supply.

The control data shown in FIG. 5 comprises a code of a plurality of bits. More specifically, the control data comprises a start signal $S_S$, a channel signal $S_C$, a control signal $S_N$ and a return signal $S_R$. The start signal $S_S$ represents the start of the control data and comprises one bit. The channel signal $S_C$ serves to designate as a channel each one of a plurality of sets comprising combinations of the transmitters 1 and the receivers 2 and comprises four bits. Therefore, the embodiment shown can designate any one of sixteen combinations of the transmitters and receivers. The control signal $S_N$ is a signal for controlling the apparatus being controlled coupled to the receiver 2 and comprises four bits. The control signal $S_N$ comprises an ON signal and an OFF signal. The return signal $S_R$ comprises a signal representing a control state of the apparatus being controlled coupled to the receiver 2 and comprises four bits. The return signal $S_R$ also comprises an ON signal and an OFF signal.

One bit of each of the above described signals $S_S$, $S_C$, $S_N$ and $S_R$ is inserted during a half cycle period of the alternating current of the power supply as shown in FIG. 6. More specifically, the half cycle of the alternating current of the power supply comprises four equally divided sections representing one unit and a carrier wave having a high frequency, say 100 kHz, higher than of the alternating current of the power supply is on/off controlled, so that a one-bit signal may be constituted by a period of four units from one zero crossing point to the next zero crossing point. The start signal $S_S$ or a signal of the logic one or zero is determined depending on the on/off state during that period of time. For example, let it be assumed that a case in which a carrier wave is superimposed during one unit section is defined as a high level, whereas a case in which no carrier wave is superimposed during one unit section is defined as a low level. However, no carrier wave is superimposed in either case during the first one unit section and furthermore the second unit section is used for a busy signal representing that the control data is in transmission. Accordingly, when the control data is to be transmitted, a carrier wave is necessarily superimposed on the second unit period even in either half cycle. Furthermore, a case where a carrier wave is superimposed on the third and fourth unit sections, the same is deemed as the logic one, whereas a case where no carrier wave is superimposed is deemed as the logic zero. Accordingly, in the case of the FIG. 6 graph, the first half cycle period comprises the low level, the high level, the low level and the high level, which is deemed as a start signal $S_S$, the next following half cycle comprises the low level, the high level, the high level and the high level, which is deemed as the logic one, and the third half cycle period comprises the low level, the high level, the low level and the low level, which is deemed as the logic zero.

Figure 7:
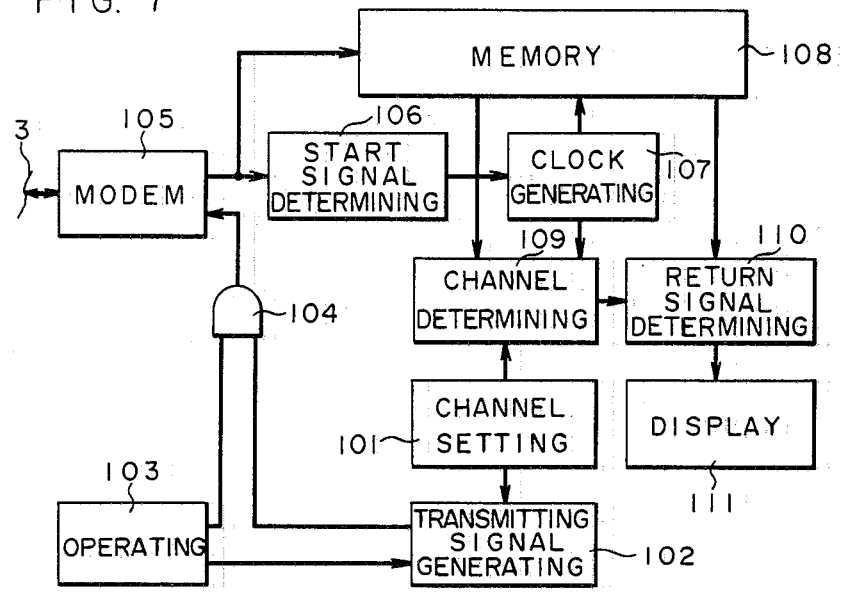
FIG. 7 is a block diagram of a transmitter employed in one embodiment of the present invention.

FIG. 7 is a block diagram of a transmitter employed in one embodiment of the present invention. Now the structure of the transmitter 1 will be described. A channel setting portion 101 serves to designate a channel of a corresponding receiver 2 and may comprise a switch or a read only memory storing in advance a channel number. The channel number set by the channel setting portion 101 is applied to a transmitting signal generating portion 102. An operating portion 103 serves to designate a control state of a corresponding receiver 2 and may comprise a keyboard, for example. The transmitting signal generating portion 102 comprises a shift register, for example, and is responsive to a clock pulse to provide a channel number set by the channel setting portion 101 and a control state signal designated by the operating portion 103 as control data previously described with reference to FIG. 5. The control data is applied to one input of an AND gate 104. The other input of the AND gate 104 is connected to receive an enabling signal from the operating portion 103. Accordingly, the AND gate 104 provides the control data obtained from the transmitting signal generating portion 102 to a modem portion 105. The modem portion 105 serves to modulate a carrier wave with the given control data to transmit a transmitting signal previously described with reference to FIG. 6 to the receiver 2.

On the other hand, the transmitting signal returned from the receiver 2 through the repeater 5 is demodulated by the modem portion 105, whereby the control data is obtained. The start signal $S_S$ included in the control data is applied to a start signal determining circuit 106. The start signal determining circuit 106 discriminates the start signal $S_S$ to provide a trigger signal to a clock generating circuit 107. The clock generating circuit 107 provides a write clock to a memory 108. The memory 108 is supplied with control data from the modem portion 105, so that the control data is in succession stored as a function of the write clock. More specifically, the memory 108 is stored with the channel signal $S_C$, the control signal $S_N$ and the return signal $S_R$. The channel signal $S_C$ is stored in the memory 108 and at the same time is read out therefrom and is applied to the channel determining circuit 109. The channel determining circuit 109 may comprise a comparator, for example, so that the channel signal $S_C$ read from the memory 108 and the channel number set by the channel setting portion 101 may be compared. The channel determining circuit 109 provides a coincidence signal to a return signal determining circuit 110, in the case where the channel number and the channel signal $S_C$ coincide with each other. The return signal determining circuit 110 may comprise a comparator, for example, and is responsive to the coincidence signal to receive the return signal $S_R$ from the memory 108, thereby to determine whether the return signal $S_R$ coincides with the return signal set in advance. The return signal determining circuit 110 displays in a display 111 the content of the return signal $S_R$ read from the memory 108 when coincidence is determined.

Figure 8:
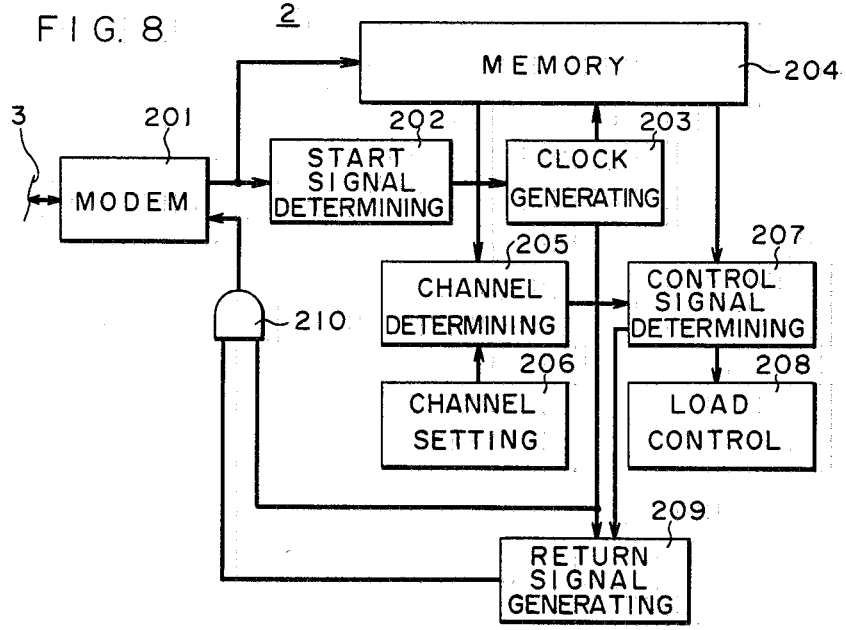
FIG. 8 is a block diagram of a receiver employed in one embodiment of the present invention.

FIG. 8 is a block diagram of the receiver 2 employed in one embodiment of the present invention. The structure of the receiver 2 will be described with reference to FIG. 8. A transmitting signal transmitted through the power line 3 from the transmitter 1 is applied to the modem portion 201 and is demodulated. The start signal $S_S$ is applied to the start signal determining circuit 202. The start signal determining circuit 202 may be structured in the same manner as that of the start signal determining circuit 106 of the transmitter 1 shown in FIG. 7. The start signal determining circuit 202 determines the start signal $S_S$, thereby to provide a trigger signal to a clock generating circuit 203. The clock generating circuit 203 is responsive to the trigger signal to provide a write clock signal to a memory 204. The memory 204 is supplied with an output signal from the modem portion 201. Accordingly, the memory 204 is responsive to the clock signal from the clock generating circuit 203 to store the channel signal $S_C$ and the control signal $S_N$. As the same time, the channel signal $S_C$ is read from the memory 204 and is applied to a channel determining circuit 205. The channel determining circuit 205 may be structured in substantially the same manner as that of the channel determining circuit 109 of the transmitter 1. The channel determining circuit 205 is supplied with a predetermined channel number from a channel setting portion 206. Accordingly, the channel determining circuit 205 compares the channel signal $S_C$ read from the memory 204 and the channel number obtained from the channel setting portion 206, and upon determination of coincidence thereof, provides a coincidence signal to a control signal determining circuit 207. The control signal determining circuit 207 may comprise a comparator, for example, and determines whether the control signal $S_N$ read from the memory 204 coincides with the predetermined control signal. Upon coincidence, a load control portion 208 is operated. The load control portion 208 may comprise a relay, thyristor and the like, and serves to on/off control a power supply of an apparatus being controlled serving as a load. The control signal determining circuit 207 controls the load control portion 208 and at the same provides a return signal $S_R$ associated with a control state of the load to the return signal generating portion 209. The return signal $S_R$ obtained from the return generating portion 209 is applied to one input of an AND gate 210. The other input of the AND gate 210 is connected to receive a clock signal from a clock generating circuit 203. Accordingly, the AND gate 210 provides to the modem portion 201 the return signal $S_R$ obtained from the return signal generating portion 209 in synchronism with the clock signal. The modem portion 201 transmits a transmitting signal including the return signal $S_R$ to the transmitter 1 over the power line 3.

Figure 9:
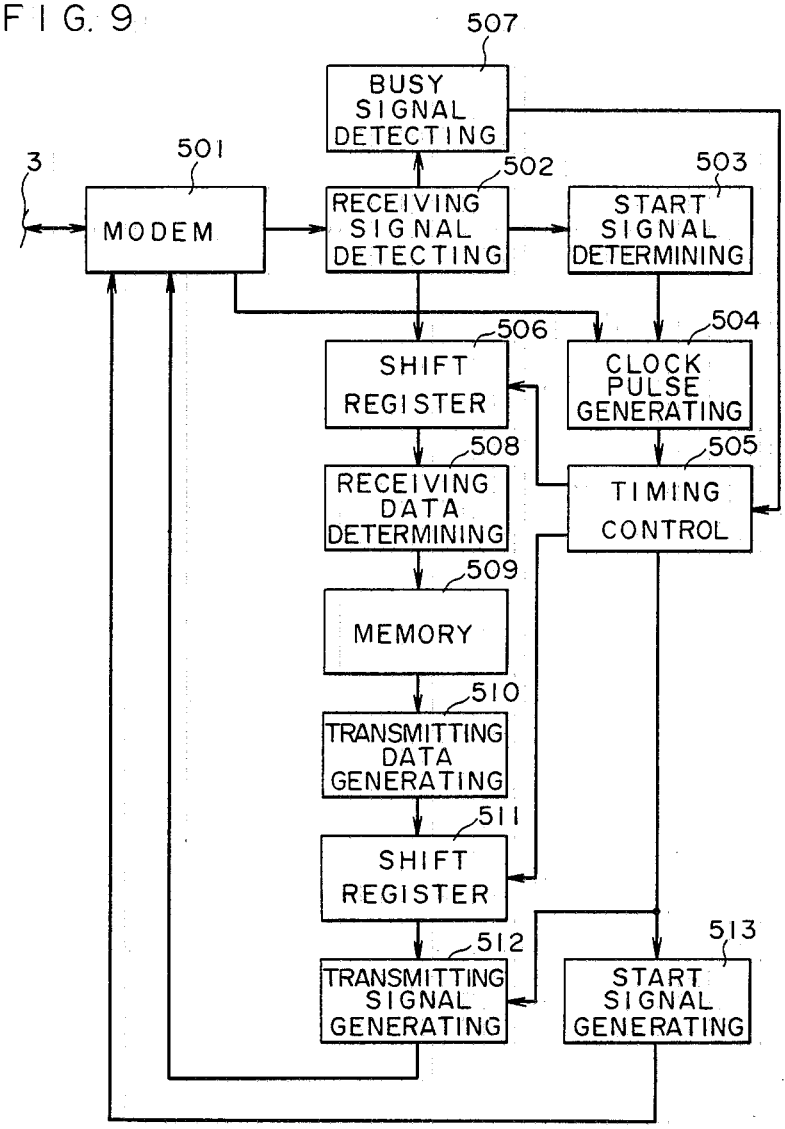
FIG. 9 is a block diagram of a repeater employed in one embodiment of the present invention.

FIG. 9 is a block diagram of the repeater 5 employed in one embodiment of the present invention. The structure of the repeater 5 will be described with reference to FIG. 9. The transmitting signal transmitted through the power line 3 from the transmitter 1 is applied to the modem portion 501 and is demodulated into a receiving signal representing a code of bit series and the receiving signal is then applied to a receiving signal detecting circuit 502. The receiving signal detecting circuit 502 is responsive to the output signal of the modem portion 501 to detect whether the code per each half cycle is the start signal $S_S$ or whether the same represents the logic one or zero. When the receiving signal detecting circuit 502 detects the receiving signal, the receiving signal is applied to a shift register 506. The start signal determining circuit 503 may be structured in substantially the same manner as that of the start signal determining circuit 104 employed in the transmitter 1 and upon determination of the start signal $S_S$ from the receiving signal a trigger signal is applied to a clock pulse generating circuit 504. The clock pulse generating circuit 504 is supplied with a zero cross detecting signal of a power supply alternating current from the modem portion 501. The clock pulse generating circuit 504 is responsive to the trigger signal to provide a clock pulse in synchronism with the zero crossing point, which is applied to a time control portion 505.

On the other hand, the above described receiving signal detecting circuit 502 also provides the receiving signal to a busy signal detecting circuit 507. The busy signal detecting circuit 507 serves to detect a busy signal which is superimposed on the power supply alternating current as shown in FIG. 6. When the busy signal is detected by the busy signal detecting circuit 507, the detected signal is applied to a timing control portion 505. The timing control portion 505 is responsive to a clock pulse from a clock pulse generating circuit 504 to provide a write clock pulse to a shift register 506. Accordingly, the shift register 506 is responsive to the write clock to temporarily store the receiving signal obtained from the receiving signal detecting circuit 502. Accordingly, the shift register 506 performs a function as a receiving buffer for temporarily storing the receiving signal. The shift register 506 is responsive to the return signal $S_R$ transmitted from the receiver 2 to store the return signal $S_R$ as well as the channel signal $S_C$ and the control signal $S_N$.

The receiving signal stored in the shift register 506 is applied to a receiving data determining circuit 508. The receiving data determining circuit 508 serves to determine which channel is designated by the channel signal $S_C$ included in the receiving signal, to determine which control state of an apparatus being controlled is represented by the control signal $S_N$, and to determine the content of the return signal $S_R$. The receiving signal is thus determined by the receiving data determining circuit 508, because it is necessary to determine whether an error has occurred while a signal is being transmitted from the transmitter 1 or the receiver 2, thereby to effect error processing by an error detecting circuit, not shown, if and when such an error occurs. The receiving signal as determined by the receiving data determining circuit 508 is stored in a memory 509.

When the timing control portion 505 comes not to be supplied with a busy signal detected signal from the busy signal detecting circuit 507, the timing control portion 505 provides an address signal to the memory 509, thereby to read the receiving signal so far stored. The read receiving signal is applied to a transmitting data generating circuit 510. The transmitting data generating circuit 510 supplies a shift register 511 with the channel signal $S_C$, the control signal $S_N$ and the return signal $S_R$ in the receiving signal as transmitting data. The shift register 511 is supplied with a write clock from the timing control portion 505. Accordingly, the shift register 511 is responsive to the write clock to store temporarily the transmitting data. More specifically, the shift register 511 performs a function as a transmitting buffer for temporarily storing the transmitting data. The transmitting data stored temporarily in the shift register 511 is applied to the transmitting signal generating circuit 512. Meanwhile, when the timing control portion 505 comes not to be supplied with a busy signal detected signal, the timing control portion 505 provides a transmitting signal generating signal to the transmitting signal generating circuit 512 and the start signal generating circuit 513. The start signal generating circuit 513 serves to generate a new start signal $S_S$ of one bit and provides the start signal $S_S$ to the modem portion 501. The transmitting signal generating circuit 512 serves to convert the channel signal $S_C$, the control signal $S_N$ and the return signal $S_R$ to a bit serial coded signal. The transmitting signal obtained from the transmitting signal generating circuit 512 is supplied to the modem portion 501 and is transmitted together with the previously described start signal $S_S$ over the power line 3 in the form of a high frequency signal superimposed on the power supply alternating current.

Figure 10:
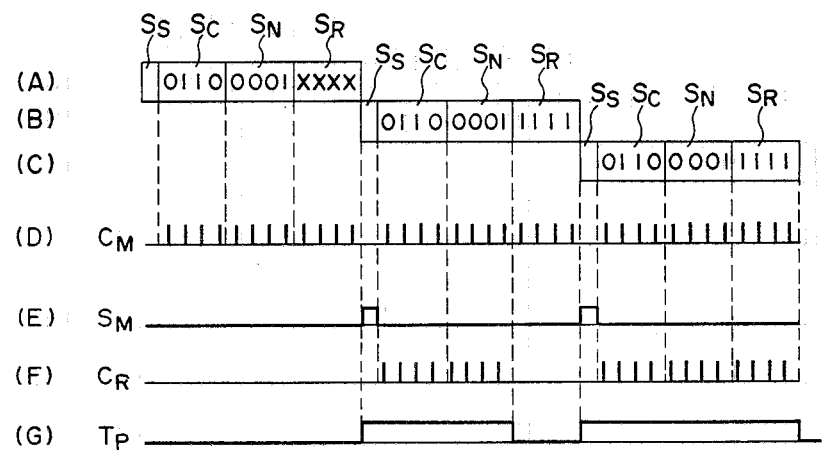
FIG. 10 is a graph showing waveforms of the signals at various portions of the FIG. 9 repeater.

FIG. 10 is a graph showing the waveforms of the electrical signals at various portions in the repeater 5 shown in FIG. 9. Now referring to FIGS. 7 to 10, a specific operation of one embodiment of the present invention will be described. When a control state of an apparatus being controlled of the receiver 2 is designated by operating the operating portion 103 of the transmitter 1, a transmitting signal is transmitted from the transmitter 1 to a receiver corresponding to the channel set by the channel setting portion 101. If and when the receiver 2 of the designated channel has been coupled to the power line 3 in the area where a signal from the transmitter 1 is receivable, the transmitting signal is received by the receiver 2. The apparatus being controlled is controlled in response to the received output of the receiver 2 and immediately the return signal $S_R$ is returned from the receiver 2 to the transmitter 1, whereby the state of the apparatus being controlled is displayed by the display 111 of the transmitter 1. However, if and when the receiver 2 has not been coupled to the power line 3 in the area where the signal from the transmitter 1 is receivable, the receiver 2 cannot receive the transmitting signal from the transmitter 1 and, therefore, the return signal $S_R$ is not returned as shown in FIG. 10(A). Meanwhile, the letter X in FIG. 10(A) denotes that the return signal $S_R$ is not returned. However, since the repeater 5 is provided between the transmitter 1 and receiver 2 in the embodiment shown, the transmitting signal transmitted from the transmitter 1 is transmitted to the receiver 2 through the repeater 5. More specifically, if and when the transmitting signal is applied from the transmitter 1 to the repeater 5, the transmitting signal is demodulated by the modem portion 501. Then the demodulated output is detected by the receiving signal detecting 502 at each cycle, whereby the start signal $S_S$, or the logic one or zero is determined. When the start signal $S_S$ is determined by the start signal determining circuit 503, a trigger signal is applied from the start signal determining circuit 503 to the clock pulse generating circuit 504. The clock pulse generating circuit 504 generates a clock pulse in synchronism with the zero crossing point of the power supply alternating current, which is then applied to the timing control portion 505. Accordingly, the timing control portion 505 provides a write clock pulse $C_M$ as shown in FIG. 10(D) to the shift register 506. Therefore, the shift register 506 temporarily stores the receiving signal obtained from the receiving signal detecting circuit 502. Since the return signal $S_R$ is not available at that time, the shift register 506 is not loaded with the return signal $S_R$. The receiving data determining circuit 508 determines the channel signal $S_C$ and the control signal $S_N$ included in the receiving signal obtained from the shift register 506, thereby to store these signals in the memory 509.

When the transmitting signal comes not to be transmitted from the transmitter 1, the busy signal detecting circuit 507 of the repeater 5 comes not to detect the busy signal. Then the timing control portion 505 provides the start signal generating signal $S_N$ as shown in FIG. 10(E) to the start signal generating circuit 513. Accordingly, the start signal generating circuit 513 generates the start signal $S_S$, which is applied to the modem portion 501. At the same time, the timing control portion 505 provides the address signal to the memory 509, so that the receiving signal stored in the memory 509 is read. The receiving signal as read is applied to the transmitting data generating circuit 510 to be used as transmitting data. The transmitting data is applied to the shift register 511. The shift register 511 is responsive to the clock pulse $C_R$ shown in FIG. 10(F) obtained from the timing control portion 505 to store the transmitting data temporarily. The transmitting data is applied to the transmitting signal generating circuit 512 so that the data is converted for each bit to a bit serial coded signal represented by four sections of each half cycle of the power supply alternating current. The coded signal obtained from the transmitting signal generating circuit 512 is applied to modem portion 501. The modem portion 501 transmits the received transmitting signal $S_S$ and the transmitting data to the receiver 2 in the form of a high frequency signal superimposed on the power supply alternating current in the manner shown in FIG. 6.

As described previously with reference to FIG. 8, the receiver 2 operates such that the start signal determining circuit 202 determines the start signal $S_S$ from the transmitting signal transmitted from the repeater 5 and the clock pulse generating circiut 203 generates a clock pulse. The channel signal $S_C$ and the control signal $S_N$ are loaded in the memory 204 as a function of the clock pulse. If and when the channel determining circuit 205 determines that the channel signal $S_C$ stored in the memory 204 is its own channel signal, then the same causes the control signal determining circuit 207 to determine the control signal $S_N$. The control signal determining circuit 207 is responsive to the control signal $S_N$ to determine to which state the apparatus being controlled is to be controlled. The determining signal from the control signal determining circuit 207 is applied to the load control portion 208 and the load control portion 208 is responsive to the determining signal to control the apparatus being controlled. At that time, the control signal determining circuit 207 determines a control state of the load, whereby the return signal generating circuit 209 generates the return signal $S_R$ representing its control state. More specifically, as shown in FIG. 10(B), the return signal $S_R$ is generated at the timing immediately after the control signal $S_N$ is transmitted from the repeater 5. The return signal $S_R$ is transmitted over the power line 3 through the modem portion 201. When the return signal $S_R$ is transmitted over the power line 3, the repeater 5 receives the return signal $S_R$ and in the same manner as described previously the same is temporarily stored in the shift register 506 and thereafter the same is stored in the memory 509. Since the memory 509 stores at that time the channel signal $S_C$ and the control signal $S_N$ transmitted from the transmitter 1, it follows that as shown in FIG. 10(C) the start signal $S_S$, the channel signal $S_C$, the control signal $S_N$ and the return signal $S_R$ are transmitted from the repeater 5 to the transmitter 1. Accordingly, as shown in FIG. 10(G), the transmitting timing of the transmitter 5 is the period of the start signal $S_S$, the channel $S_C$ and the control signal $S_N$ when the transmitting signal from the transmitter 1 is repeated to the receiver 2 and is the period of the start signal $S_S$, the channel signal $S_C$, the control signal $S_N$ and the return signal $S_R$ when the transmitting signal from the receiver 2 is repeated to the transmitter 1. The transmitter 1 receives the transmitting signal transmitted from the repeater 5 and the channel determining circuit 109 determines the channel and the return signal determining circuit 110 determines the return signal $S_R$ if and when the corresponding channel is determined. The return signal determining circuit 110 determines the return signal $S_R$ and the same is displayed by the display 111.

As described in the foregoing, the repeater 5 is provided between the transmitter 1 and receiver 2 and the transmitting signal transmitted from the transmitter 1 is stored in the shift register 505 of the repeater 5, whereupon the transmitting signal is transmitted to the receiver 2. Therefore, even if the transmitter 1 and receiver 2 are far remotely provided, attenuation of the level of the transmitting signal over the power line 3 is compensated by the repeater 5. Since the reurn signal $S_R$ returned from the receiver 2 is transmitted through the repeater 5 to the transmitter 1, either signal transmitted from the transmitter 1 or the receiver 2 can be transmitted without substantial attenuation of the same in terms of the level.

Figure 11:
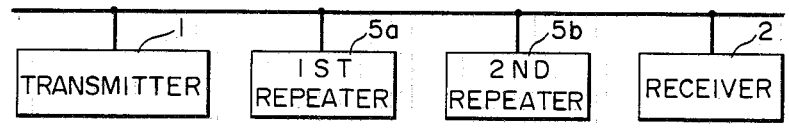
FIG. 11 is a block diagram showing a data transmission system employing two repeaters as shown in FIG. 9.
Figure 12:
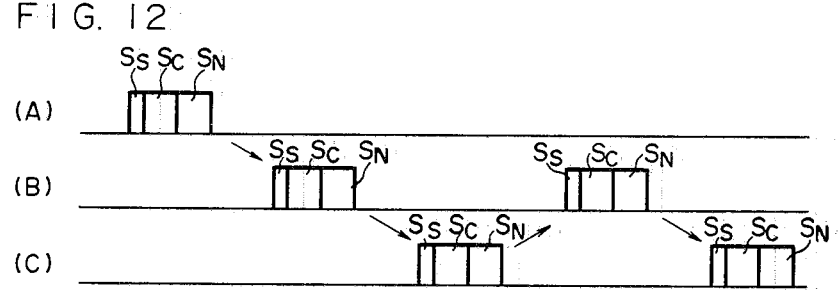
FIG. 12 is a timechart for depicting an operation of the FIG. 11 data transmission system.

FIG. 11 is a block diagram of a data transmission system utilizing two repeaters 5 shown in FIG. 9. FIG. 12 is a time chart for explaining an operation of the data transmission system shown in FIG. 11.

In the case where the distance between the transmitter 1 shown in FIG. 7 and the receiver 2 shown in FIG. 8 is large, provision of only one repeater 5 between the transmitter 1 and the receiver 2 is not enough for transmission of the data depending on the situation. In such a case, two repeaters 5a and 5b need be provided. However, provision of two repeaters 5a and 5b involves a problem to be described in the following. More specifically, although the first repeater 5a transmits a transmitting signal transmitted from the transmitter 1 to the second repeater 5b, the first repeater 5a simultaneously performs a repeating operation for transmitting the transmitting signal from the receiver 2 repeated by the second repeater 5b to the transmitter 1 as a matter of course. However, since each of the repeaters 5a and 5b performs a repeating operation of a transmitting signal bidirectionally, the second repeater 5b, for example, transmits the transmitting the signal from the first repeater 5a to the receiver 2 and at the same time transmits the same also to the first repeater 5a. Accordingly, the transmitting signal transmitted from the transmitter 1 at the timing shown in FIG. 12(A) is continually repeated mutually between the two repeaters 5a and 5b as shown, in FIG. 12(B) and (C). Accordingly, the transmitting signal from the transmitter 1 comes not to be transmitted properly to the receiver 2, whereby confusion arises in operation between the repeaters 5a and 5b. In the following, therefore, an embodiment for eliminating such problem will be described.

Figure 13:
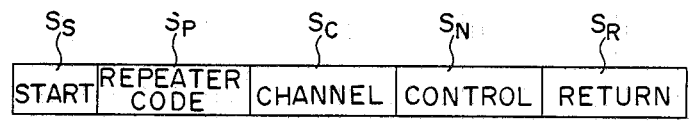
FIG. 13 is a view depicting the contents of the transmitting signal transmitted in accordance with another embodiment of the present invention.
Figure 14:
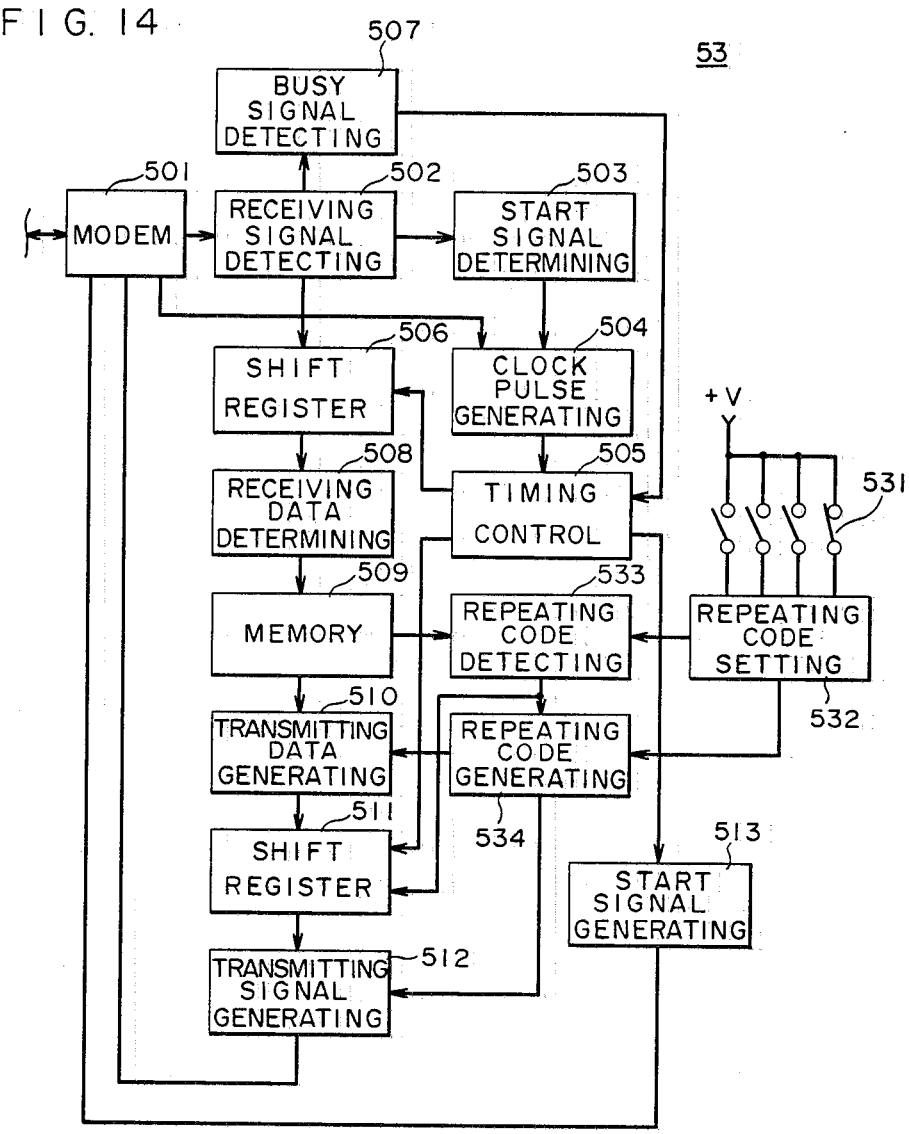
FIG. 14 is a block diagram of a repeater employed in the other embodiment of the present invention.

FIG. 13 is a diagram showing a transmitting signal transmitted by another embodiment of the present invention. FIG. 14 is a block diagram of a repeater 53 employed in the other embodiment of the present invention.

According to the embodiment shown, a repeater code $S_P$ of four bits as well as the start signal $S_S$, the channel signal $S_C$, the control signal $S_N$ and the return signal $S_R$ is transmitted as the transmitting signal, as shown in FIG. 13. To that end, the transmitting signal generating circuit 102 of the transmitter 1 shown in FIG. 7 is adapted to formulate the repeater code $S_P$ of the initial value having the logical value of "0000" so that the same may be transmitted.

On the other hand, the repeater 53 shown in FIG. 14 comprises a repeating code setting switch 531, a repeating code setting circuit 532, a repeating code detecting circuit 533 and a repeating code generating circuit 534 newly provided as compared with the repeater 5 shown in FIG. 9. Meanwhile, the shift register 506, the memory 509 and the shift register 511 included in the repeater 53 each comprises a storing region capable of storing the repeating code $S_P$ of four bits. The repeating code setting switch 531 is used to set the repeating code unique to the repeater. More specifically, in the case where the two repeaters 5a and 5b as shown in FIG. 11 are provided, one repeater 5a is allotted the repeating code having the first bit set to one such as "0001" while the other repeater 5b is allotted the repeating code having the second bit set to one such as "0010". Thus the repeating code set by the repeating code setting switch 531 is applied through the repeating code setting circuit 532 to the repeating code detecting circuit 533 and the repeating code generating circuit 534. The repeating code stored in the memory 509 is applied to the repeating code detecting circuit 533. The repeating code detecting circuit 533 comprises a comparator so that the same may compare the repeating code obtained from the repeating code setting circuit 532 and the repeating code applied to the memory 509. More specifically, the repeating code detecting circuit 533 determines whether one has been set in a predetermined bit position. If one has not been set in such position, the repeating code detecting circuit 533 provides a non-coincidence signal to the repeating code generating circuit 534 and the shift register 511. When the shift register 511 is supplied with the non-coincidence signal, the transmitting data obtained from the memory 509 through the transmitting data generating circuit 510 is stored. If and when the repeating code generating circuit 534 is supplied with the non-coincidence signal, the repeating code read from the memory 509 is renewed in response to the repeating code obtained from the repeating code setting circuit 532. The repeating code renewed by the repeating code generating circuit 534 is applied to the transmitting signal generating circuit 512.

Now an operation of the embodiment shown will be described. When the transmitting signal is transmitted from the transmitter 1 to the first repeater 5a, the repeating code "0000" is stored in the memory 509. Since "0001" has been set as the repeating code in the repeater 5a by means of the repeating code setting switch 531, the repeating code detecting circuit 533 compares the repeating code "0000" transmitted from the transmitter 1 and the repeating code "0001" set by the repeating code setting switch 531, thereby to determine whether one has been set in the first bit of the repeating code. If and when one has not been set, the channel signal $S_C$ and the control signal $S_N$ stored in the memory 509 are stored in the shift register 511. At the same time the repeating code generating circuit 534 is responsive to the repeating code "0001" obtained from the repeating code setting circuit 532 to renew the repeating code transmitted from the transmitter 1 from "0000" to "0001". The renewed repeating code is applied to the transmitting signal generating circuit 512. The transmitting signal generating circuit 512 provides the renewed repeating code $S_P$ as well as the channel signal $S_C$ and the control signal $S_N$ to the modem portion 501. Then the transmitting signal is transmitted from the modem portion 501 to the second repeater 5b.

The second repeater 5b stores the repeating code "0001" transmitted from the first repeater 5a in the memory 509. Since the repeater 5b has been allotted "0010" as the repeating code, the repeating code detecting circuit 533 compares the repeating codes "0001" and "0010", thereby to determine that one has not been set in the second bit of the repeating code "0001" transmitted from the first repeater 5a. Then one is set in the second bit of the repeating code by means of the repeating code generating circuit 534 and the new repeating code "0011" is provided to the transmitting signal generating circuit 512. The repeating code thus renewed as well as the other signals is transmitted from the modem portion 501. The transmitting signal thus transmitted is transmitted to the receiver 2 and also transmitted to the first repeater 5a. However, since in the first repeater 5a one has been set in the first bit of the repeating code "0011" transmitted from the second repeater 5b, the transmitting data is not loaded in the shift register 511. Accordingly, even if the transmitting signal is transmitted by the second repeater 5b, the first repeater 5a does not perform a repeating operation of the transmitting signal.

As described in the foregoing, the repeating code for designating each repeater is transmitted with the same included in the transmitting signal and each of the repeaters 5a and 5b is adapted to determine whether a repeating operation is to be performed or not based on whether one has been set in a predetermined bit position of the repeating code and therefore a repeating operation of the transmitting signal is prevented from being repetitiously performed between the two repeaters 5a and 5b.

Figure 15:
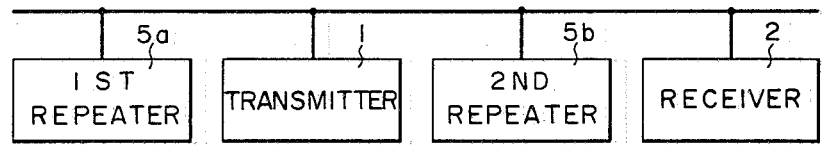
FIG. 15 is a block diagram showing another example of a data transmission system employing two repeaters as shown in FIG. 9.
Figure 16:
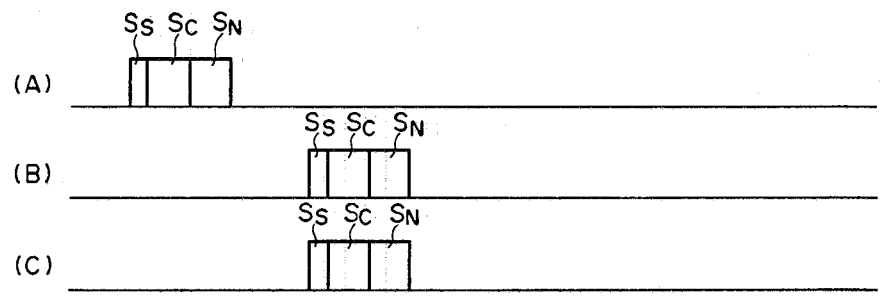
FIG. 16 is a timechart for depicting an operation of the FIG. 15 data transmission system.

FIG. 15 is a block diagram showing a further embodiment of the data transmission system utilizing two repeaters shown in FIG. 9 and FIG. 16 is a timechart for explaining an operation of the data transmission system shown in FIG. 15.

It could happen that a plurality of transmitters 1, a plurality of receivers 2, and a plurality of repeaters 5 as shown in FIGS. 7 to 9 are provided to constitute a data transmission system. In such case, it could happen that the first repeater 5a and the second repeater 5b are disposed at one position of the transmission line 3 and at the other position of the power line 3 spaced apart from the transmitter 1 in one direction and in the other direction, respectively, as shown in FIG. 15. However, in such a case a problem to be described in the following could arise. More specifically, if and when the transmitter 1 transmits the transmitting signal at the timing shown in FIG. 16(A), the first and second repeaters 5a and 5b repeat the transmitting signal at the same timing as shown in FIGS. 16(B) and 16(C). Therefore, interference occurs in the transmitting signal repeated by the two repeaters 5a and 5b.

Therefore, according to the embodiment shown, each of the repeaters 5a and 5b is provided with a means for delaying the time of initiating transmission so that the delay time may be different to determine the order of initiation of transmission, thereby to avoid interference of the transmitting signals transmitted by the two repeaters 5a and 5b. To that end, the repeater 54 comprises a delay time setting switch 541, a down counter 542, and AND gates 543 and 544 provided in addition to the repeater 5 shown in FIG. 9. The delay time setting switch 541 aims to set the delay time data to be selected to be different for each of the repeaters 5a and 5b. More specifically, the first repeater 5a is allotted a delay time t1 and the second repeater 5b is allotted a delay time data t2. The output obtained from the delay time setting switch 541 is applied to the preset input of the down counter 542. The load input of the down counter 542 is supplied with a busy signal detected signal from the busy signal detecting circuit 507. Accordingly, if and when the down counter 542 is supplied with a busy signal detected signal, the data of the delay time set by the setting switch 541 is loaded. The count output signal from the down counter 542 is applied to the AND gate 543. When the down counter 542 completes a counting operation of the set time period, i.e. when the count value in the down counter becomes zero, the AND gate 543 provides the zero detected signal to one input of the AND gate 544, the transmission signal generating circuit 512 and the start signal generating circuit 513. The other input of the AND gate 544 is supplied with a clock pulse from the clock pulse generating circuit 504. Accordingly, the AND gate 544 provides a clock pulse to the down counter 542 only during a time period when the zero detected signal is not obtained from the AND gate 533. When the zero detected signal is obtained from the AND gate 543, the transmitting signal generating circuit 512 and the start signal generating circuit 513 are enabled, whereby the transmitting signal and the start signal are applied to the modem portion 501.

Figure 18:
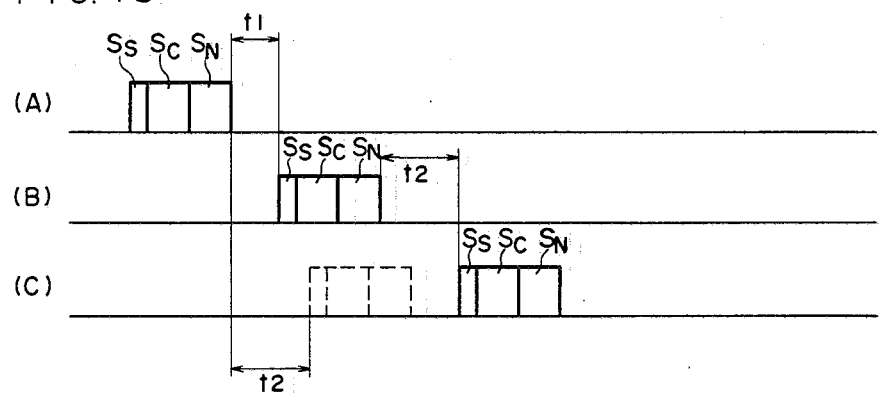
FIG. 18 is a timechart for depicting an operation of the FIG. 17 repeater.
Figure 17:
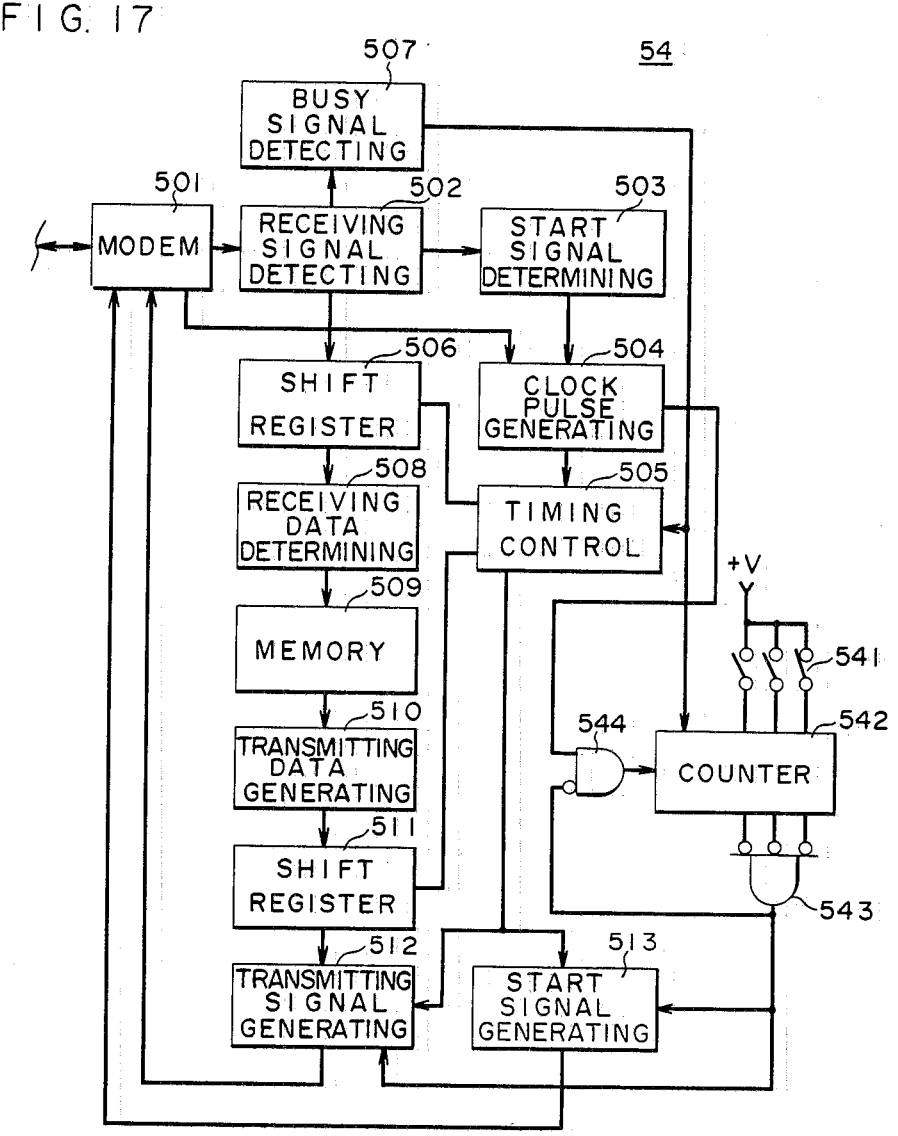
FIG. 17 is a block diagram showing a repeater employed in a further embodiment of the present invention.

Now referring to the timechart shown in FIG. 18, an operation of the repeater 54 shown in FIG. 17 will be described. The data of the delay time t1 is set by the setting switch 541 in the first repeater 5a shown in FIG. 15 and the data of the delay time t2 is set by the second repeater 5b. When the transmitting signal is transmitted by the transmitter 1 at the timing shown in FIG. 18(A), the busy signal detecting circuit 507 of each of the repeaters 5a and 5b detects a busy signal included in the transmitting signal. The down counter 542 is responsive to the busy signal detected signal to load the data concerning the delay time period set by the setting switch 541. Since the down counter 542 keeps loading the set delay time data during a time period when the busy signal detected signal is obtained, no down count operation is performed even if a clock pulse is applied through the AND gate 544. When the transmitter 1 completes transmission of the transmitting signal, the busy signal detecting circuit 507 comes not to detect the busy signal. Accordingly, the down counter 542 included in each of the repeaters 5a and 5b is responsive to the clock pulse to make a down count operation. When the down counter 542 of the first repeater 5a counts the clock pulses for the delay time period t1, the count value becomes zero. The AND gate 544 is responsive to the zero detected signal to be disabled, whereby the down counter 542 comes not be supplied with the clock pulse. At the same time, the transmitting signal generating circuit 512 and the start signal generating circuit 513 are responsive to the zero detected signal to be enabled. The transmitting signal generating circuit 512 and the start signal generating circuit 513 serve to generate the transmitting signal and the start signal, respectively, which are then applied to the modem portion 501. The modem portion 501 transmits the transmitting signal at the timing shown in FIG. 18(B), i.e. after a delay of the time period of t1 after transmission of the transmitting signal by the transmitter 1. Since a busy signal is included in the transmitting signal, the busy signal detecting circuit 507 of the second repeater 5b detects a busy signal and the busy signal detected signal is applied to the down counter 542. Accordingly, the down counter 542 is supplied with a busy signal detected signal while the same is making a count operation of the delay time period t2 after transmission of the transmitting signal by the transmitter 1 is ended and therefore the delay time t2 is loaded again. Therefore, during a time period when the first repeater 5a is repeating the transmitting signal, the AND gate 543 included in the second repeater 5b does not provide the zero detected signal and the second repeater 5b does not transmit the transmitting signal during a time period when the first repeater 5b is repeating the transmitting signal as shown in FIG. 18(C). When the first repeater 5a ends a repeating operation of the transmitting signal, the second repeater 5b starts repeating the transmitting signal after the lapse of the time period t2 thereafter.

As described in the foregoing, the embodiment shown is structured such that a delay time may be set in each of the repeaters 5a and 5b so that a repeating operation may be initiated after the lapse of the different time period after the end of the transmission of the transmitting signal and therefore a repeating operation of the transmitting signal is not performed simultaneously both from the repeaters 5a and 5b and as a result no interference occurs in the transmitting signals repeated by the respective repeaters 5a and 5b.

Figure 19:
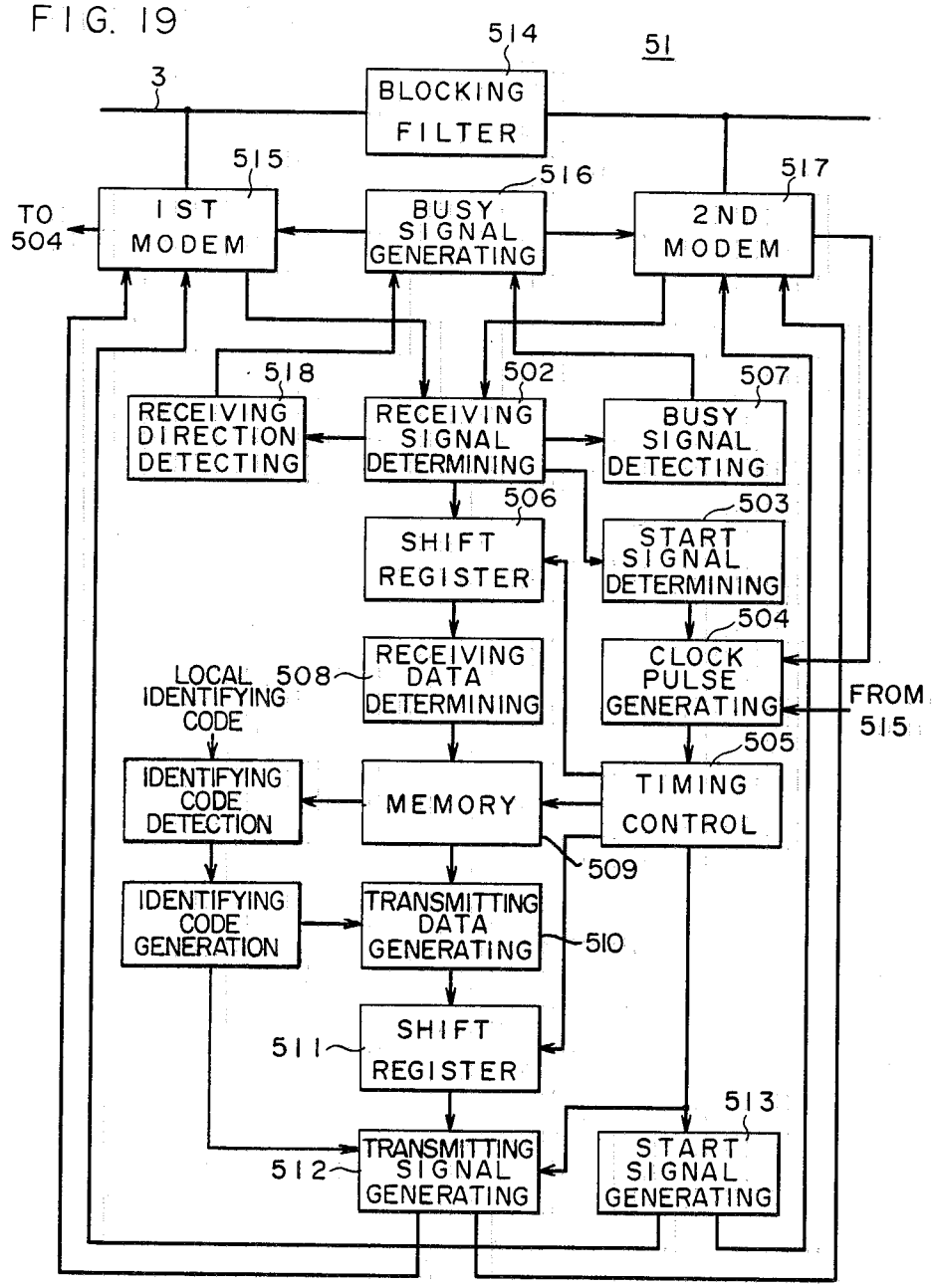
FIG. 19 is a block diagram of a repeater employed in the further embodiment of the present invention.

FIG. 19 is a block diagram of a repeater 51 employed in the further embodiment of the present invention. FIG. 20 is a schematic diagram of one example of a blocking filter 514 employed in the FIG. 19 embodiment. FIG. 21 is a graph depicting an operation of the repeater 51 shown in FIG. 19.

The FIG. 19 repeater 51 comprises a blocking filter 514 interposed in the power line 3 serving as a means for blocking a high frequency signal, whereby the transmitting signal is transmitted from the repeater 51 to the receiver 2 with a delay of one bit from the transmission timing when the transmitting signal is transmitted from the transmitter 1 to the repeater 51, whereby the transmission time of the transmitting signal is shortened. More specifically, the blocking filter 514 is interposed in the power line 3. As shown in FIG. 20, the blocking filter 514 comprises a combination of a parallel resonance circuit including an inductance L1 and a capacitor C1, and a series resonance circuit including an inductance L2 and a capacitor C2, and a parallel resonance circuit including an inductance L3 and a capacitor C3. More specifically, the parallel resonance circuit connected in series with the power line 3 exhibits a high impedance with respect to a carrier wave of the high frequency signal, and a series resonance circuit connected in parallel with the power line 3 exhibits a low impedance with the respect the carrier wave of the high frequency signal. The blocking filter 514 serves to block passage of the carrier wave and to allow for passage of a power supply alternating current. Accordingly, the carrier wave received from one end of the power line 3 is blocked by the blocking filter 514, while the carrier wave is transferred through the repeater 51 toward the other end of the power line 3 with respect to the blocking filter 514. For facility of description, it is assumed that the transmitter 1 is coupled to the power line 3 at one position spaced apart in one direction and the receiver 2 is coupled to the power line 3 at the other position spaced apart in the other direction. The first modem portion 515 is coupled to the power line 3, while the second modem portion 517 is coupled to the power line 3 at the other position. The receiving signal demodulated by the first modem portion 515 and the receiving signal received by the second modem portion 517 are both applied to the receiving signal determining circuit 502. The start signal determining circuit 503 to the start signal generating circuit 513 other than the above described circuits are substantially the same as those shown in the FIG. 9 embodiment.

Now an operation of the embodiment will be described. When the transmitting signal is transmitted from the transmitter 1 over the power line 3, the transmitting signal is demodulated by the first modem portion 515 and the receiving signal is applied to the receiving signal determining circuit 502. The receiving signal is then stored in the memory 509 through the shift register 506 as in the case of the FIG. 9 embodiment. Meanwhile, although the FIG. 9 embodiment was adapted such that when the busy signal is detected by the busy signal detecting circuit 507 the busy signal detected signal is applied to the timing control portion 505, the repeater 51 shown in the embodiment now in description is adapted such that the busy signal detected signal is not applied to the timing control portion 505. Accordingly, when a first clock pulse is applied from the clock pulse generating circuit 504, the timing control portion 505 immediately provides the transmission signal generating signal $S_M$ to the start signal generating circuit 513. Accordingly, the start signal generating circuit 513 generates the start signal $S_S$ immediately after the start signal $S_S$ from the transmitter 1 is applied to the repeater 51, and the start signal $S_S$ is applied to the second modem portion 517, as shown in FIG. 21(B). After the timing control portion 505 provides the start signal generating signal $S_M$, the same provides the read clock pulse $C_R$ to the memory 509 after a delay of one bit, whereby the receiving signal stored in the memory 509 is read. Furthermore, the write clock pulse $C_N$ is provided with a delay of one bit from the read clock pulse $C_R$ and the transmitting data is temporarily stored in the shift register 511. The transmitting data is applied through the transmission signal generating circuit 512 to the second modem portion 517. Accordingly, the second modem portion 517 transmits the transmitting signal from the other end of the blocking filter 514 to the receiver 2. When the return signal $S_R$ is transmitted from the receiver 2, the second modem portion 517 demodulates the return signal $S_R$ and provides the output to the receiving signal determining circuit 502. When the receiving signal determining circuit 502 determines the return signal $S_R$, the return signal $S_R$ is stored through the shift register 506 in the memory 509. As in the case of the previously described FIG. 9 embodiment, the memory 509 is also stored with the channel signal $S_C$ and the control signal $S_N$. The respective signals stored in the memory 509 are read as a function of the read clock pulse $C_O$ shown in FIG. 21(J). The read signal becomes the transmitting data and is transmitted from the transmitting signal generating circuit 512 through the first modem portion 515 to the transmitter 1.

As described in the foregoing, the embodiment is adapted such that the blocking filter 514 is interposed in the power line 3 so that the transmitting signal may not be directly transmitted from the transmitter 1 to the receiver 2 and rather through the repeater 51. As a result, the transmitting signal transmitted from the transmitter 1 can be transmitted to the receiver with the delay of one bit. Therefore, according to the embodiment now in description, the transmitting signal is transmitted from the transmitter 1 to the repeater 51 and thereafter the same can be transmitted from the repeater 51 to the receiver 2 with a delay of one bit as compared with the transmitting signal transmitted from the transmitter 1 without being transmitted from the repeater 51 to the receiver 2. As a result, a period of time required for data transmission can be shortened.

FIG. 22 is a block diagram showing an example in which two repeaters 51 shown in FIG. 19 are interposed between the transmitter 1 and the receiver 2 and FIGS. 23 and 24 are views for depicting the flow of the transmitting signal in the data transmission system shown in FIG. 22.

By providing two repeaters 51 shown in FIG. 19 between the transmitter 1 and the receiver 2 as shown in FIG. 22, it is possible to lengthen the distance between the transmitter 1 and the receiver 2. However, a problem to be described in the following arises when two repeaters 51a and 51b are interposed between the transmitter 1 and the receiver 2. More specifically, as shown in FIG. 23, it is assumed that the transmitter 1 transmits the transmitting signal at the timing t0 and the first repeater 51a transmits the repeated transmitting signal to the second repeater 51b at the timing t1, and the second repeater 51b transmits the repeated transmitting signal to the receiver 2 at the timing t2. Then the receiver 2 transmits the return signal $S_R$ to the second repeater 51b at the timing t3. When the transmitter 1 transmits the next transmitting signal at the timing t3, the first repeater 51a transmits the transmitting signal to the second repeater 51b. As a result, the second repeater 51b receives the signal from both the first repeater 51a and the receiver 2 at the timing t3. In such a case, the repeater 51 shown in FIG. 19 serves to disregard the transmitting signal which started being transmitted later, i.e. the transmitting signal transmitted from the first repeater 51a at the timing t2 shown in FIG. 23, whereby the said transmitting signal comes not to be repeated.

When two transmitting signals are transmitted from the transmitter 1 at the timings t0 and t1 as shown in FIG. 24, the first repeater 51a is in transmission to the second repeater 51b at the timing t1 and therefore cannot receive the transmitting signal transmitted from the transmitter 1 at the timing t1. As a result, it follows that the transmitting signal transmitted later is not repeated at all. In order to eliminate such inconvenience, an approach may be considered in which two signals can be processed simultaneously by the repeater 51; however, a structure of the repeater 51 adapted to achieve such operation would become extremely complicated.

Therefore, the FIG. 19 repeater 51 has been adapted such that when the transmitting signal is transmitted from one end of the power line 3 toward the blocking filter 514 a busy signal is provided to the other end of the power line toward the blocking filter 514, whereby the above described inconvenience may be eliminated. More specifically, the repeater 51 is provided with a busy signal generating circuit 516 and a receiving direction detecting circuit 518. The receiving direction detecting circuit 518 is supplied with a receiving signal determined by the receiving signal determining circuit 512. The receiving direction detecting circuit 518 detects from which end of the power line with respect to the blocking filter 514 the transmitting signal was transmitted, based on determination by the receiving signal determining circuit 502 whether the modulation output is provided from either the first modem portion 515 or the second modem portion 517. The detected output of the receiving direction detecting circuit 518 is applied to the busy signal generating circuit 516. The busy signal generating circuit 516 is supplied with the detected signal obtained from the busy signal detecting circuit 517. Accordingly, when the detected signal is obtained from the busy signal detecting circuit 507 and the detected signal of the receiving direction is obtained from the receiving direction detecting circuit 518, the busy signal generating circuit 516 provides a busy signal to the first modem portion 515 and the second modem portion 517.

FIG. 25 is a timechart for depicting the timing of the transmitting signal received and the busy signal transmitted by the repeater 51 shown in FIG. 19. FIG. 26 is a view for depicting the flow of signals in the data transmission system in the case where the busy signal is transmitted while the transmitting signal is received by the repeater 51 shown in FIG. 19. FIG. 27 is a timechart for depicting the timing of the transmitting signal and the busy signal transmitted by the repeater 51 shown in FIG. 19. FIG. 28 is a view for depicting the flow of the signals in the data transmission system in the case where the busy signal is transmitted while the transmitting signal is transmitted by the repeater 51 shown in FIG. 19.

Now referring to FIGS. 19 and 25 to 28, an operation for generating the busy signal by the repeater 51 will be described. As shown in FIG. 26, when the transmitting signal is transmitted from the transmitter 1 to the repeater 51 at the timing t0, the receiving direction detecting circuit 518 detects transmission of the transmitting signal from one end of the blocking filter 514, thereby to provide the detected signal to the busy signal generating circuit 516. At that time the busy signal detecting circuit 507 detects the busy signal transmitted from the transmitter 1 and provides the detected signal to the busy signal generating circuit 516. Accordingly, the busy signal generating circuit 516 provides the busy signal to the second modem portion 517. The second modem portion 517 superimposes the high frequency signal in the second section of each half cycle of the power supply alternating current, as shown in FIG. 6, whereby the power line 3 is placed in a busy state between the other end side of the power line of the blocking filter 514 and the second repeater 51b. Accordingly, the second repeater 51b is placed in a busy standby state. Meanwhile, referring to FIG. 26, the linear arrow denotes the transmitting signal and the wave-shaped arrow denotes the busy signal. Thus, the during a time period when the transmitting signal is received from one end side of the power line 3, the repeater 51 can place the other end side of the power line 3 in a busy state. Now it is assumed that at the timing t2 the transmitter 1 transmits the transmitting signal to the first repeater 51a. Then at the timing t3 the first repeater 51a tries to repeat the transmitting signal from the transmitter 1 to the second repeater 51b; however, at the timing t3 the receiver 2 is transmitting the return signal $S_R$ to the second repeater 51b. Accordingly, the second repeater 51b is responsive to reception of the return signal $S_R$ from the receiver 2 to transmit the busy signal on the power line 3 on the end side of the first repeater 51a. Therefore, the first repeater 51a is placed in a standby state, with the transmitting signal from the transmitter 1 stored in the memory 509. At the timing t4 the transmitting signal is transmitted from the second repeater 51b to the first repeater 51a, whereby the first repeater 51a which was placed in a standby state at the timing t5 starts transmission, whereby transmission is performed at the timing t6 from the first repeater 51a to the transmitter 1, while the second repeater 51b performs transmission to the receiver 2. Accordingly, each of the repeaters 51a and 51b can continue a repeating operation without rendering the transmitting signal ineffective.

In the foregoing description, the embodiment was adapted such that while the transmitting signal is transmitted from one end side of the blocking filter 514 the busy signal is transmitted to the other end side of the blocking filter 514; however, alternatively the embodiment may be adapted such that while either the repeater 51a or 51b transmits the transmitting signal to one end side of the blocking filter 514 the busy signal is transmitted to the other end side of the blocking filter 514. More specifically, the first modem portion 515 and the second modem portion 517 shown in FIG. 19 have a function of demodulating the transmitting signal simultaneously when the same modulate the transmitting signal and transmit the same over the power line 3. Accordingly, when the transmitting signal is provided from the transmitting signal generating circuit 512 to the first modem portion 515 or the second modem portion 517, the transmitting signal is modulated to be transmitted over the power line 3 and at the same time the transmitting signal is demodulated so that the receiving signal is applied to the receiving signal determining circuit 502. The receiving direction detecting circuit 518 is responsive to the determination output from the receiving signal determining circuit 502, thereby to determine in which direction the transmitting signal is transmitted. The busy signal generating circuit 516 is responsive to the determination output from the receiving direction detecting circuit 518 to generate a busy signal, which is transmitted from the second modem portion 517 on the other end side onto the power line 3. The flow of the signals at that time will be described with reference to FIGS. 27 and 28. When the transmitting signal as shown in FIG. 27(A) is transmitted from the first modem portion 515 onto the power line 3, the busy signal continually assuming the high level is transmitted from the second modem portion 517 during a time period when the transmitting signal is transmitted, as shown in FIG. 27(B). An operation corresponding to FIG. 24 will be described with reference to FIG. 28. The first repeater 51a transmits the signal to the second repeater 51b at the timing t1. Since the first repeater 51a has been transmitting the busy signal to the transmitter 1 at that time, the transmitter 1 which is about to transmit the signal at the timing t1 is placed in a busy standby state and the first repeater 51a starts transmission at the timing t2 when the busy signal comes not to be transmitted. As a result, the first repeater 51a can repeat the second transmitting signal transmitted from the transmitter 1 at the timing t3.

FIG. 29 is a block diagram of still a further embodiment of the present invention. FIG. 30 is a graph showing waveforms of the signal at the major portion of the repeaters 51a and 51b employed in the FIG. 29 embodiment. FIG. 31 is a view for depicting the flow of the signals at the data transmission system shown in FIG. 29.

In the case where two units of such repeater 51 as shown in FIG. 19 are connected to the power line 3 and the first transmitter 1a and the first receiver 2a are connected at the section of one repeater 51a while the second transmitter 1b and the second receiver 2b are connected to the section of the other repeater 51b, a problem to be described in the following could arise. More specifically, it is assumed that different transmitting signals are transmitted from the first transmitter 1a and the second transmitter 1b to the first receiver 2a. In such a case, the first receiver 2a first operates in accordance with the transmitting signal obtained from the first transmitter 1a. Thereafter the first receiver 2a operates in accordance with the transmitting signal repeated by the second repeater 51b and the first repeater 51a from the second transmitter 1b. Conversely, the second receiver 2b first operates in accordance with the transmitting signal from the second transmitter 1b and thereafter operates in accordance with the transmitting signal transmitted from the first transmitter 1a through the first repeater 51a and the second repeater 51b. More specifically, it follows that although the first receiver 2a, for example, is a receiver of the same channel designated by the first transmitter 1a or the second transmitter 1b the same differently operates in accordance with the different control signals. The reasons is that the power line 3 has not been insulated by the blocking filter 514 and therefore the respective transmitters 1a and 1b and the respective receivers 2a and 2b could operate simultaneously at a plurality of positions. In order to eliminate such inconvenience, the respective repeaters 51a and 51b are adapted such that when such busy signal as shown in FIG. 30(A) is transmitted from one end side through the power line 3 the busy signal as shown in FIG. 30(B) is obtained on the other end side of the power line 3, whereby the power line 3 is forcedly placed in a busy state. For example, referring to FIG. 29, when the first transmitter 1a starts transmission of the transmitting signal, the first repeater 51a transmits a busy signal over the power line 3 in the first repeater 51a and the second repeater 51b to place the same in a busy state. Since the power line 3 on the side of the first repeater 51a is placed in a busy state, the second repeater 51b places the power 3 on the side of the second power line 1b in a busy state. Therefore, referring to FIG. 19, the busy signal generating circuit 516 is responsive to the detected output of the receiving direction detecting circuit 518 and the detected output of the busy signal detecting circuit 517 to determine transmission of the busy signal from one end side of the power line 3 and to transmit the busy signal to the other end side of the power line 3. By thus structuring the repeaters 51a and 51b, when the first transmitter 1a transmits the transmitting signal at the timing t0 as shown in FIG. 31, the first repeater 51a transmits the busy signal to the section of the second reopeater 51b. Then, the second repeater 51b determines that the busy signal is transmitted from the first repeater 51a, thereby to transmit the busy signal to the second transmitter 1b. Then the second transmitter 1b is placed in a busy standby state.

Meanwhile, in the case where the transmitting signal from the first repeater 51a and the return signal $S_R$ from the second receiver 2b are transmitted to the second repeater 51b at the same timing in the FIG. 29 data transmission system, it could happen that the operation of the second repeater 51b becomes indefinite and no busy signal is obtained and such an operation shown in FIG. 26 is not performed. In order to eliminate such state, therefore, an approach may be considered in which the transmitting signal from the first repeater 51a is preferentially received by the second repeater 51b.

Figure 32:
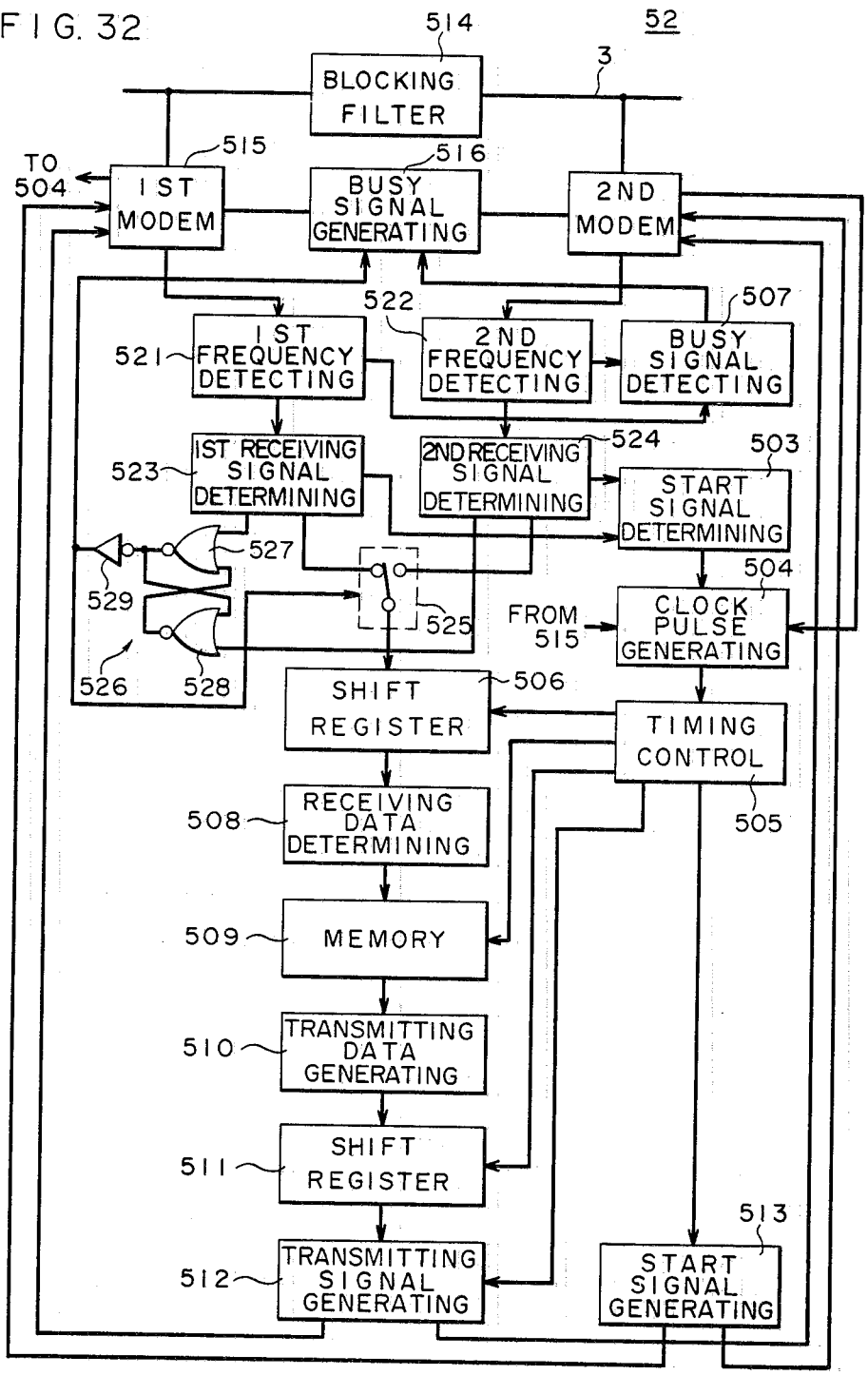
FIG. 32 is a block diagram of a repeater employed in the said further embodiment of the present invention.

FIG. 32 is a block diagram of such repeater. The FIG. 32 repeater 52 is substantially the same as the FIG. 19 repeater 51, except of the following respects. More specifically, a first frequency detecting circuit 521 is connected to the demodulation output of the first modem portion 515 and a second frequency detecting circuit 522 is connected to the demodulation output of the second modem portion 517. The first frequency detecting circuit 521 serves to detect whether the frequency of the receiving signal obtained from the first modem portion 515 is of a proper frequency. Likewise, the second frequency detecting circuit 522 serves to detect whether the frequency of the receiving signal obtained from the second modem portion 517 is of a proper frequency. The detected output of the first frequency detecting circuit 521 is applied to the first receiving signal determining circuit 523 and the busy signal detecting circuit 517. The detected signal of the second frequency detecting circuit 522 is applied to the second frequency signal determining circuit 524. The first receiving signal determining circuit 523 serves to determine the start signal $S_S$ and the logic zero or one included in the receiving signal demodulated by the first modem portion 515. The second receiving signal determining circuit 524 likewise serves to determine the start signal $S_S$ and the logic zero or one included in the receiving signal demodulated by the second modem portion 517. The receiving signal determined by the first and second receiving signal determining circuits 523 and 524 are applied to the start signal determining circuit 503 and the switching circuit 525. The start signal $S_S$ determined by the first and second receiving signal determining circuits 523 and 524 is applied to the receiving direction determining circuit 526. The receiving direction determining circuit 526 comprises an RS flip-flop implemented by NOR gates 527 and 528. The start signal determined by the first receiving signal determining circuit 523 is applied to the set input of the NOR gate 527 and the start signal determined by the second receiving signal determining circuit 524 is applied to the reset input of the NOR gate 528. The RS flip-flop is structured such that the set input is preferential as compared with the reset input. Accordingly, the receiving direction determining circuit 526 is set responsive to the start signal obtained from the first receiving signal determining circuit 523 when the start signal $S_S$ is obtained simultaneously from the first receiving signal determining circuit 523 and the second receiving signal determining circuit 524. The output of the NOR gate 527 is inverted by the inverter 529 and is applied to the switching circuit 525 as a switching signal and is also applied to the busy signal generating circuit 516.

Now an operation of the repeater 52 will be described. When the first and second modem portions 515 and 517 receive simultaneously the transmitting signal, the same demodulates the respective transmitting signals and provides the receiving signal to the first and second frequency detecting circuits 521 and 522. The first and second frequency detecting circuits 521 and 522 detect whether the frequencies of the respective receiving signals are proper and, if both are detected as proper, the detected output is applied to the busy signal detecting circuit 507 and to the first and second receiving signal determining circuits 523 and 524. The first and second receiving signal determining circuits 523 and 524 each determine the start signal $S_S$ and the respective start signal $S_S$ is applied to the receiving direction determining circuit 526. However, since the receiving direction determining circuit 526 has been supplied with the preferential order at the set input, the same is set in response to the start signal $S_S$ obtained from the first receiving signal determining circuit 523. As a result, a receiving direction signal representative of reception of the transmitting signal by the first modem portion 515 is obtained from the receiving direction determining circuit 526 and the switching circuit 525 is responsive to the receiving direction signal to be turned to the first receiving signal determining circuit 523. Accordingly, the shift register 506 stores the receiving signal obtained from the first receiving signal determining circuit 523. At the same time, the receiving direction signal is applied from the receiving direction determining circuit 526 to the busy signal generating circuit 516. At that time the busy signal generating circuit 516 is provided with the busy detected output from the busy detecting circuit 507. Accordingly, the busy signal generating circuit 516 determines that the first modem portion 515 is receiving the transmitting signal and provides the busy signal to the second modem portion 517.

As described in the foregoing, the receiving direction is determined by the receiving direction determining circuit 526 as a function of the start signal $S_S$ determined by the first and second receiving signal determining circuits 523 and 524 and the preferential order is given to the input of the receiving direction determining circuit 526. Therefore, even if the transmitting signals are simultaneously applied to the first and second modem portions 515 and 517, the transmitting signal is processed with a preference to the first modem portion 515.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission system for transmitting control data including a plurality of bits in the form of a high frequency signal superimposed on an alternating current imposed on a power line, said system comprising first communicating means and second communicating means coupled to said power line, and a plurality of repeating means serially interposed in said power line between said first and said second communicating means, for transmission of said control data over said power line between said first and said second communicating means and through said repeater means, said control data including an identifying code for identifying an adjacent repeating means, said first communicating means including
  first transmitting means for transmitting said control data to said second communicating means, and
  first receiving means for receiving said control data transmitted from said second communicating means,
said second communicating means including
  second receiving means including means being controlled, for receiving said control data transmitted from said first communicating means and for controlling said means being controlled in response to said control data, and
  second transmitting means for transmitting control state data representing a control state of said means being controlled to said first communicating means, and
each of said plurality of repeater means having an associated identifying code and including
  high frequency signal blocking means coupled to said power line for blocking passage of said high frequency signal and for allowing passage of said alternating current,
  third receiving means for receiving control data transmitted from one of said first and said second communicating means, coupled to said power line,
  identifying code determining means, responsive to the output of said third receiving means, for determining whether the identifying code included in said control data corresponds to the identifying code associated with the repeater means receiving the control data, and for providing an output in response to determining a match between the identifying code included in said control data and the identifying code associated with the repeater receiving the control data,
  storing means, responsive to the output signal from said identifying code determining means, for storing said received control data,
  identifying signal renewing means, responsive to the output signal from said identifying code determining means, for modifying the identifying code included in the control data stored in said storing means, to a new identifying code identifying an adjacent repeater means, and
  third transmitting means for reading the control data stored in said storing means after a lapse of a predetermined time from reception of said control data by said third receiving means, and for transmitting the control data read out of said storing means including the new identifying code renewed by said renewing means.

2. A data transmission system utilizing a power line in accordance with claim 1, wherein each of said repeater means further comprises:
  means for transmitting a busy signal from one side of said high frequency signal blocking means toward one of said first and said second communicating means the busy signal, representing that said control data is being transmitted on the other side of said high frequency signal blocking means.

3. A data transmission system utilizing a power line in accordance with claim 2, wherein each of said repeater means further provides said busy signal toward said one of said first and said second communicating means when said control data is being transmitted from the direction of the other one of said first and said second communicating means.

4. A data transmission system utilizing a power line in accordance with claim 2, wherein each of said repeater means further provides said busy signal from one side of said high frequency signal blocking means and towards said one of said first and said second communicating means when a busy signal is being received from the other side of said high frequency blocking means.

5. A data transmission system utilizing a power line in accordance with claim 4, wherein each of said repeater means further comprises:
  means for preferentially receiving said control data originating from one of said first and said second communicating means and for transmitting said busy signal towards the other one of said first and said second communicating means when said control data is originating from both said first and second communicating means.

6. A data transmission system utilizing a power line in accordance with claim 1, wherein each of said repeater means further comprises:
  busy signal providing means for providing a busy signal to said adjacent repeater means when said third transmitting means is transmitting said control data including said renewed identifying code;
  busy signal determining means for determining if said third receiving means received a busy signal; and
  transmission inhibiting means for inhibiting said third transmitting means from transmitting said control data including the renewed identifying code when said busy signal determining means determines that said third receiving means received the busy signal.

* * * * *